(12) United States Patent
Lei et al.

(10) Patent No.: US 11,458,639 B2
(45) Date of Patent: Oct. 4, 2022

(54) SYSTEMS FOR CHANGING TOOLS ON A GRIPPER APPARATUS

(71) Applicant: Mujin, Inc., Tokyo (JP)

(72) Inventors: Lei Lei, Tokyo (JP); Yixuan Zhang, Tokyo (JP)

(73) Assignee: MUJIN, INC., Tokyo (JP)

(*) Notice: Subject to any disclaimer, the term of this patent is extended or adjusted under 35 U.S.C. 154(b) by 327 days.

(21) Appl. No.: 16/748,539

(22) Filed: Jan. 21, 2020

(65) Prior Publication Data

US 2021/0016456 A1 Jan. 21, 2021

Related U.S. Application Data

(60) Provisional application No. 62/875,880, filed on Jul. 18, 2019.

(51) Int. Cl.
*B25J 15/06* (2006.01)

(52) U.S. Cl.
CPC ................ *B25J 15/0616* (2013.01)

(58) Field of Classification Search
CPC ........ B25J 15/0616; B25J 15/04; B25J 15/06; B25J 15/0625; B25J 9/16; B25J 9/0009; B25J 9/1689; B25J 9/1694; B65G 67/02
See application file for complete search history.

(56) References Cited

U.S. PATENT DOCUMENTS

| | | | |
|---|---|---|---|
| 9,623,569 B2* | 4/2017 | McCollum | B65G 67/24 |
| 10,011,022 B1* | 7/2018 | Lin | B25J 15/0061 |
| 10,350,755 B2 | 7/2019 | Wagner et al. | |
| 2009/0193642 A1* | 8/2009 | Lin | B25J 15/0061 29/428 |
| 2009/0288458 A1* | 11/2009 | Lin | B25J 15/0061 70/174 |
| 2015/0086316 A1* | 3/2015 | Greenberg | B25J 15/0052 414/800 |
| 2017/0062263 A1* | 3/2017 | Kesil | H01L 21/67259 |

FOREIGN PATENT DOCUMENTS

| | | |
|---|---|---|
| JP | H05-069362 A | 3/1993 |
| JP | 2017-042909 A | 3/2017 |
| JP | 2018-038879 A | 3/2018 |

OTHER PUBLICATIONS

Notice of Reasons for Rejection for related Japanese Patent Application No. 2020-011318 dated May 14, 2020; English translation provided (6 pages).
Decision to Grant for related Japanese Patent Application No. 2020-011318 dated Jun. 25, 2020 (3 pages).

* cited by examiner

*Primary Examiner* — Stephen A Vu

(74) *Attorney, Agent, or Firm* — Procopio, Cory, Hargreaves & Savitch LLP

(57) ABSTRACT

A tool system for a robotic arm is provided. The tool system includes a tool support structure; a tool structure, coupled to the tool support structure, having at least one structural member; a connector mechanically coupled to the structural member and shaped for engaging the tool support structure; and a control unit mechanically coupled to the at least one structural member and configured to sense and adjust performance of the tool structure based on determining a connection to the tool support structure.

17 Claims, 11 Drawing Sheets

SYSTEMS FOR CHANGING TOOLS ON A GRIPPER APPARATUS

CROSS-REFERENCE TO RELATED APPLICATIONS

This application claims benefit of priority from Provisional U.S. Patent application Ser. No. 62/875,880, filed Jul. 24, 2019, the contents of which are incorporated by reference.

BACKGROUND

Field

The present disclosure relates to a tool changing system for gripper apparatuses and more specifically, a tool changing system for gripper apparatuses for pick-and-place robotic systems.

Related Art

Related Gripper apparatuses for robotic manufacturing systems are often used to grasp and manipulate objects. However, such related art systems suffer from some common deficiencies, such as low vacuum flow, which prevents vacuum pressure from being used at the same time as when an object is being grasped. Specifically, related art gripper apparatuses position vacuum generators away from the tool head of the robotic arm, often at the base or shoulder of the arm, and use extended tubing to connect the source to vacuum nozzles on the tool head or tip of the arm. This extended tubing causes diminished vacuum pressure to be available at the vacuum nozzles.

Additionally, related art systems are not capable of matching variable grippers to the specific object to be grasped due to unavailability of a tool changing mechanism. Related art systems may also have a control unit or control module that is positioned in an area distant from a robotic arm or robotic tool. With the control unit located away from the robotic arm or tool, control signals sent to, and feedback signals received from, the control unit may be subject to excessive electrical noise. Voltage-based analog signals may also be highly susceptible to the electrical noise, resulting in unreliable sensor data.

Thus, there is an unmet need for gripper apparatuses that are capable of matching variable grippers to a specific object without related art issues such as signal noise. Example implementations of the present application may address deficiencies in the related art systems.

SUMMARY OF THE DISCLOSURE

Aspects of the present application may include a tool structure for a robotic arm. The tool structure may include at least one structural member, a connector, and a control unit. The connector may be mechanically coupled to the structural member and shaped for engaging a tool support structure located on the robotic arm. Further, the connector may have at least one compressed air channel disposed within the connector and positioned for receiving compressed air from the tool support structure, and at least one signal line disposed within the connector and positioned for receiving one or more electrical signals from the tool support structure. The control unit may be mechanically coupled to the at least one structural member, and communicatively coupled to the connector. Further, the control unit may be configured to sense and adjust performance of the tool structure based on determining that the connector is connected to the tool support structure.

Additional aspects of the present application may include a tool system for a robotic arm. The tool system may include a tool support structure, a tool structure, and a control unit. The tool structure may be coupled to the tool support structure and may include at least one structural member, and a connector mechanically coupled to the structural member and shaped for engaging a tool support structure located on the robotic arm. The control unit may be mechanically coupled to the at least one structural member, and communicatively coupled to the connector. Further, the control unit may be configured to sense and adjust performance of the tool structure based on determining that the connector is connected to the tool support structure.

Further aspects of the present application may include a tool structure for a robotic arm, the tool structure having at least one structural member, a connector, a control unit, and a tool head. The connector may be mechanically coupled to the structural member and shaped for engaging a tool support structure located on the robotic arm. Further, the connector may have at least one compressed air channel disposed within the connector and positioned for receiving compressed air from the tool support structure, and at least one signal line disposed within the connector and positioned for receiving one or more electrical signals from the tool support structure. The control unit may be mechanically coupled to the at least one structural member, and communicatively coupled to the connector. Further, the control unit may be configured to sense and adjust performance of the tool structure. The tool head may be mechanically coupled to the at least one structural member. Further, the tool head may be controlled by the control unit through the connector and the tool head may include a vacuum generator disposed on the at least one structural member. The vacuum generator may be configured to receive compressed air and generate vacuum pressure in response to compressed air received from the tool support structure.

BRIEF DESCRIPTION OF THE DRAWINGS

Exemplary embodiment(s) of the present invention will be described in detail based on the following figures, wherein.

DETAILED DESCRIPTION

Figure 1A:
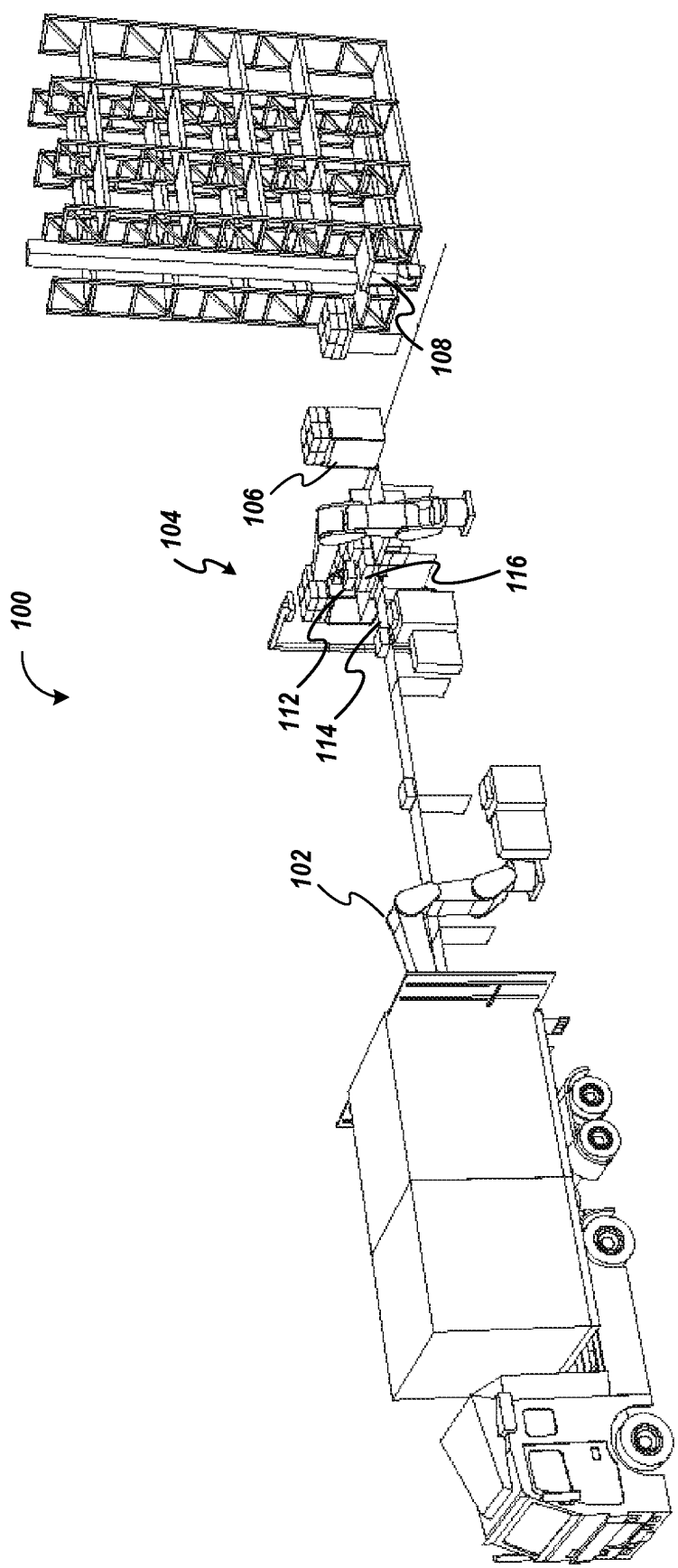
FIG. 1A is an illustration of an example environment in which a robotic system in accordance with example embodiments of the present application.

The following detailed description provides further details of the figures and example embodiments of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing embodiments of the present application. Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present application.

In the present application, the term "computer readable medium" may include a local storage device, a cloud-based storage device, a remotely located server, or any other storage device that may be apparent to a person of ordinary skill in the art.

In the present application, the term "mechanically coupled" may include direct physical connections between two or more components, or indirect physical connections between two or more components that are connected together by one or more additional components. For example, a first component may be mechanically coupled to a second component by being directly connected together or by being connected by a third component. The term "mechanically coupled" may also include a direct or indirect connection that allows fluid (e.g., liquids or gases) to flow between two or more components.

In the present application, the term "communicatively coupled" may include direct electronic connection between two or more components to allow communication signals to exchanged, indirect electronic connection between two or more component electronically connected together by one or more additional components, direct wireless communication connection between two or more components, or indirect wireless communication connection between two or more components wirelessly connected by one or more additional components or any combination of direct, indirect or wireless communication connection. For example a first component may be communicatively coupled to a second component by being directly electrically connected, indirectly electrically connected by one or more additional components or by being wireless connected either directly (e.g., via a Bluetooth or other direct wireless connection) or indirectly (e.g., via a wireless router or other wireless connection device).

Suitable Environments

FIG. 1A is an illustration of an example environment in which a robotic system 100 with a variable gripper apparatus in accordance with example embodiments of the present application. The robotic system 100 includes one or more structures (e.g., robots) configured to execute one or more tasks. Aspects of the piece-loss management mechanism can be practiced or implemented by the various structures.

For the example illustrated in FIG. 1A, the robotic system 100 can include an unloading unit 102, a transfer unit 104, a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van for storage in a warehouse, or to unload objects from storage locations and load them onto a truck or a van for shipping. For another example, the task can include moving objects from one container to another container. Each of the units can be configured to execute a sequence of actions (e.g., operating one or more components therein) to execute a task.

In some embodiments, the task can include manipulation (e.g., moving and/or reorienting) of a target object 112 (e.g., boxes, cases, cages, pallets, etc.) from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 (e.g., a palletizing robot) can be configured to transfer the target object 112 from a location on the conveyor belt to a location on the transport unit 106, such as for loading the target object 112 on a pallet on the transport unit 106.

According to another example embodiment, the transfer unit 104 (e.g., a piece-picking robot) can be configured to transfer the target object 112 from one container to another container. In completing the operation, the transport unit 106 can transfer the target object 112 from an area associated with the transfer unit 104 to an area associated with the loading unit 108. The loading unit 108 can transfer the target object 112 (by, e.g., moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments and for other purposes, such as for manufacturing, assembly, packaging, healthcare, and/or other types of automation. It is also understood that the robotic system 100 can include other units, such as manipulators, service robots, modular robots, etc., not shown in FIG. 1.

For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

Suitable System

Figure 1B:
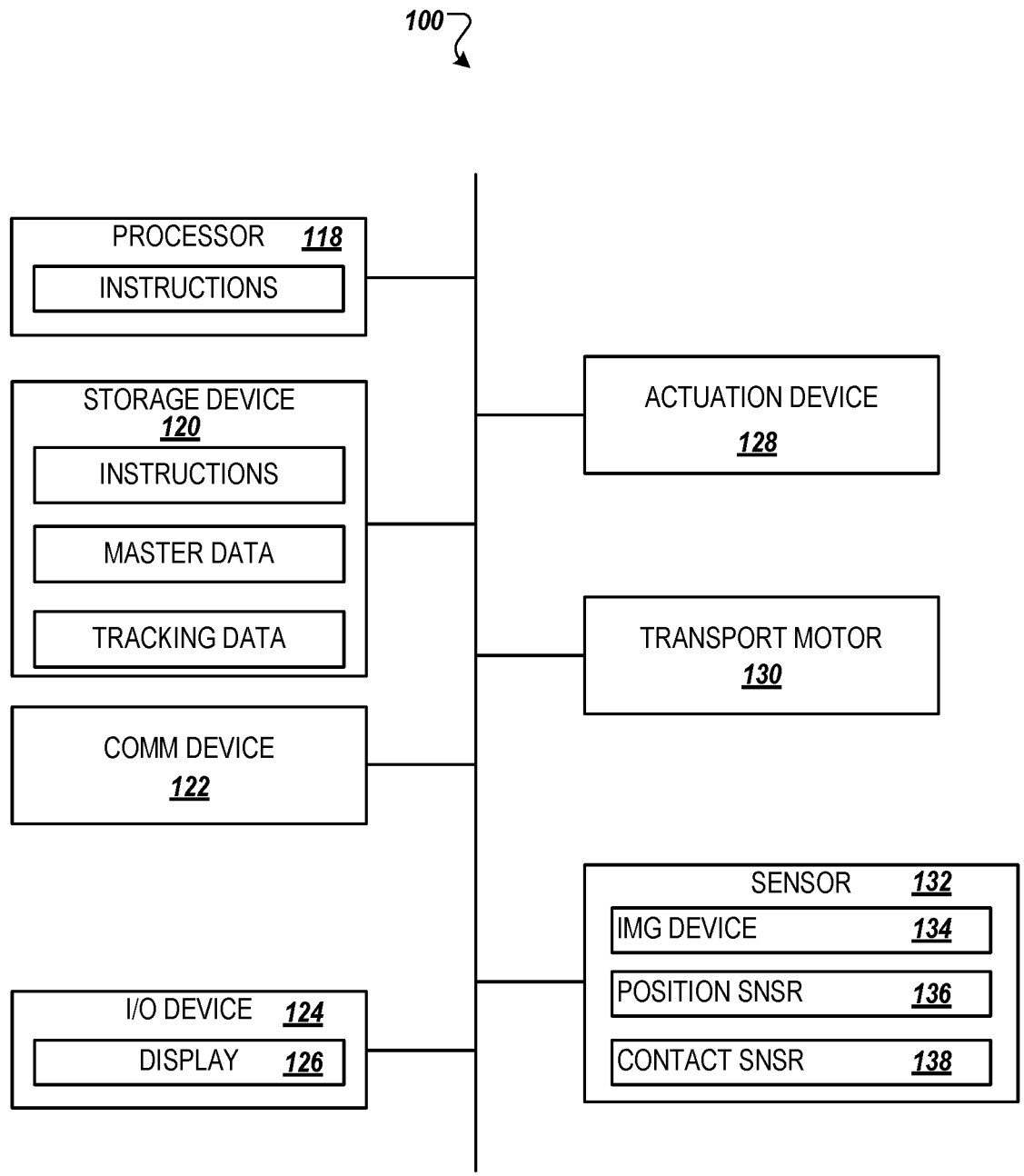
FIG. 1B is a block diagram illustrating the robotic system in accordance with example embodiments of the present application.

FIG. 1B is a block diagram illustrating the robotic system 100 in accordance with one or more embodiments of the present technology. In some embodiments, for example, the robotic system 100 (e.g., at one or more of the units and/or robots described above) can include electronic/electrical devices, such as one or more processors 118, one or more storage devices 120, one or more communication devices 122, one or more input-output devices 124, one or more actuation devices 128, one or more transport motors 130, one or more sensors 132, or a combination thereof.

The various devices can be communicatively coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "FIREWIRE"). Also, for example, the robotic system 100 can include bridges, adapters, controllers, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 118 can include data processors (e.g., central processing units (CPUs), special-purpose computers, and/or onboard servers) configured to execute instructions (e.g., software instructions) stored on the storage devices 120 (e.g., computer memory). The processors 118 can implement the program instructions to control/interface with other devices, thereby causing the robotic arm 200 to execute actions, tasks, and/or operations.

The storage devices 120 can include non-transitory computer-readable media having stored thereon program instructions (e.g., software). Some examples of the storage devices 120 can include volatile memory (e.g., cache and/or random-access memory (RAM) and/or non-volatile memory (e.g., flash memory and/or magnetic disk drives). Other examples of the storage devices 120 can include portable memory drives and/or cloud storage devices.

In some embodiments, the storage devices 120 can be used to further store and provide access to processing results and/or data/thresholds (e.g., predetermined data and thresholds). For example, the storage devices 120 can store master data that includes descriptions of objects (e.g., boxes, cases, and/or products) that may be manipulated by the robotic system 100. In one or more embodiments, the master data can include a dimension, a shape (e.g., templates for potential poses and/or computer-generated models for recognizing the object in different poses), a color scheme, an image, identification information (e.g., barcodes, quick response (QR) codes, logos, etc., and/or expected locations thereof), an expected weight, or a combination thereof for the objects expected to be manipulated by the robotic system 100. In some embodiments, the master data can include manipulation-related information regarding the objects, such as a center-of-mass location on each of the objects, expected sensor measurements (e.g., for force, torque, pressure, and/or contact measurements) corresponding to one or more actions/maneuvers, or a combination thereof.

Also, for example, the storage devices 120 can store object tracking data. In some embodiments, the object tracking data can include a log of scanned or manipulated objects. In some embodiments, the object tracking data can include imaging data (e.g., a picture, point cloud, live video feed, etc.) of the objects at one or more locations (e.g., designated pickup or drop locations and/or conveyor belts). In some embodiments, the object tracking data can include locations and/or orientations of the objects at one or more locations.

The communication devices 122 can include circuits configured to communicate with external or remote devices via a network. For example, the communication devices 122 can include receivers, transmitters, modulators/demodulators (modems), signal detectors, signal encoders/decoders, connector ports, network cards, etc. The communication devices 122 can be configured to send, receive, and/or process electrical signals according to one or more communication protocols (e.g., the Internet Protocol (IP), wireless communication protocols, etc.). In some embodiments, the robotic arm 200 can use the communication devices 122 to exchange information between units of the robotic system 100 and/or exchange information (e.g., for reporting, data gathering, analyzing, and/or troubleshooting purposes) with systems or devices external to the robotic system 100.

The input-output devices 124 can include user interface devices configured to communicate information to and/or receive information from operators (e.g., human operators). For example, the input-output devices 124 can include a display 126 and/or other output devices (e.g., a speaker, a haptics circuit, or a tactile feedback device, etc.) for communicating information to the human operator. Also, the input-output devices 124 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 124 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 128 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 130 configured to transport the corresponding units/chassis from place to place.

The robotic system 100 can include the sensors 132 configured to obtain information used to implement the tasks, such as for manipulating the structural members and/or for transporting the robotic units. The sensors 132 can include devices configured to detect or measure one or more physical properties of the robotic system 100 (e.g., a state, a condition, and/or a location of one or more structural members/joints thereof) and/or for a surrounding environment. Some examples of the sensors 132 can include accelerometers, gyroscopes, force sensors, strain gauges, tactile sensors, torque sensors, and position encoders.

In some embodiments, for example, the sensors 132 can include one or more imaging devices 134 (e.g., 2-dimensional and/or 3-dimensional cameras including visual and/or infrared cameras, lidars, radars, and/or other distance-measuring or imaging devices) configured to detect the surrounding environment. The imaging device 134 can detect and generate a representation of the detected environment, such as a digital image and/or a point cloud, used for implementing machine/computer vision (e.g., for automatic inspection, robot guidance, or other robotic applications). As described in further detail below, the robotic system 100 (via, e.g., the processors 118) can process the digital image and/or the point cloud to identify the target object 112 of FIG. 1A, the start location 114 of FIG. 1A, the task location 116 of FIG. 1A, a pose of the target object 112 of FIG. 1A, or a combination thereof.

For manipulating the target object 112, the robotic system 100 (e.g., via the various units) can capture and analyze an image of a designated area (e.g., inside the truck, inside the container, or a pickup location for objects on the conveyor belt) to identify the target object 112 and the start location 114 thereof. Similarly, the robotic system 100 can capture and analyze an image of another designated area (e.g., a drop location for placing objects on the conveyor belt, a location for placing objects inside the container, or a location on the pallet for stacking purposes) to identify the task location 116.

Also, for example, the sensors 132 can include position sensors 136 (e.g., position encoders, potentiometers, etc.) configured to detect positions of structural members (e.g., the robotic arms and/or the end-effectors) and/or corresponding joints of the robotic system 100. The robotic system 100 can use the position sensors 136 to track locations and/or orientations of the structural members and/or the joints during execution of the task.

In some embodiments, the sensors 132 can include contact sensors 138 (e.g., pressure sensors, force sensors, strain gauges, piezoresistive/piezoelectric sensors, capacitive sensors, elastoresistive sensors, and/or other tactile sensors) configured to measure a characteristic associated with a direct contact between multiple physical structures or surfaces. The contact sensors 138 can measure the characteristic that corresponds to a grip of the end-effector (e.g., the gripper) on the target object 112. Accordingly, the contact sensors 138 can output a contact measure that represents a quantified measure (e.g., a measured force, torque, position, etc.) corresponding to a degree of contact or attachment between the gripper and the target object 112. For example, the contact measure can include one or more force or torque readings associated with forces applied to the target object 112 by the end-effector. Details regarding the contact measure are described below.

As described in further detail below, the robotic system 100 (via, e.g., the processors 118) can implement different actions to accomplish the task based on the contact measure. For example, the robotic system 100 can regrip the target object 112 if the initial contact measure is below a threshold. Also, the robotic system 100 can intentionally drop the target object 112, adjust the task location 116, adjust a speed or an acceleration for the action, or a combination thereof, if the contact measure falls below a threshold during execution of the task.

Example embodiments of end effectors (e.g., the gripper) according to the present application may have greater flexibility in tool selection and customization by providing a capability to change a tool head based on needed capabilities. For example, variable grippers may be swapped to match the type of object to be grasped. Matching may be done based on the size of the object, the delicacy of the object, or any other factor that might be apparent to a person of ordinary skill in the art. This change ability is provided by a connector structure communicatively coupled to a control module configured to sense the change in tool and adjust signal I/O operation and supplied compressed air feeds to correspond to the requirements of the new tool.

Figure 2:
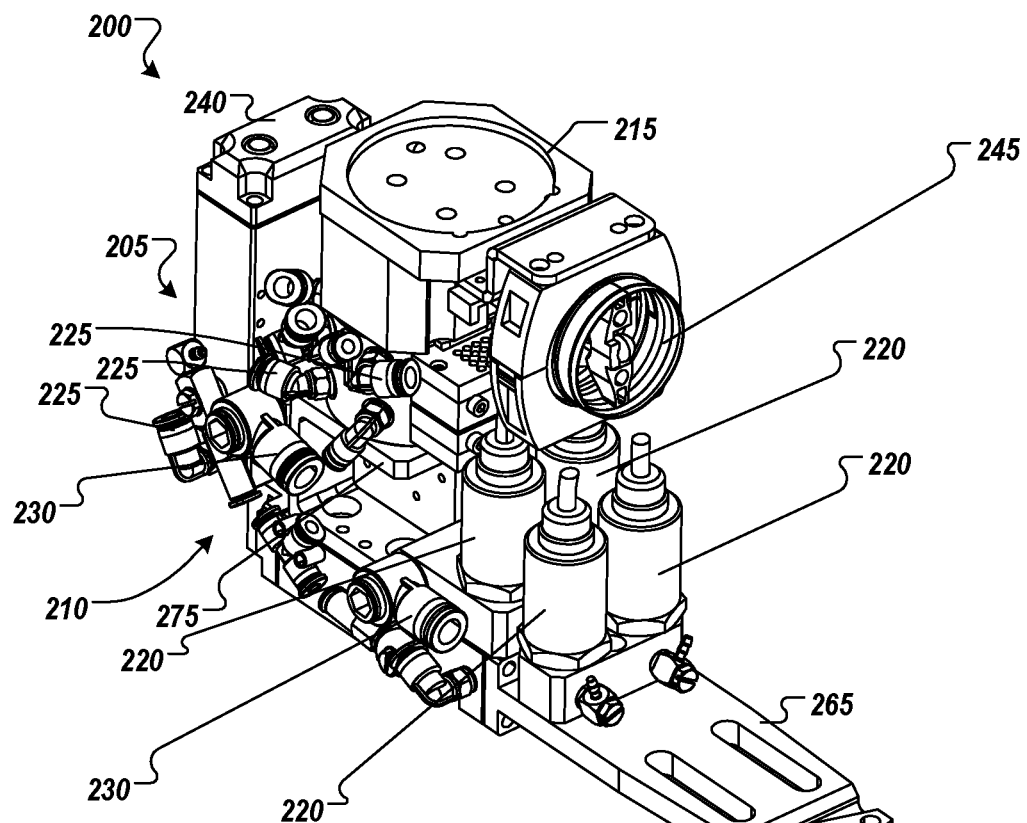
FIG. 2 illustrates a perspective view of a robotic arm in accordance with example embodiments of the present application.

FIG. 2 illustrates a perspective view of robotic arm 200 in accordance with example embodiments of present application. In FIG. 2, the robotic arm 200 is illustrated with the upper structure (referred to herein as the "shoulder") removed. The shoulder structure is discussed below with respect to FIGS. 8 and 9. As illustrated in FIG. 2, the robotic arm 200 includes a tool support structure 205 and a tool structure portion 210. For purposes of explanation herein, the tool structure 210 may be referred to as a "hand" of the robotic arm 200 and the tool support structure 205 may be referred to as a "wrist" of the robotic arm 200. In example embodiments of the present application, the tool support structure 205 or wrist may be configured to connect with different types or configurations of tool structures or hands. FIGS. 2-4 and 9 illustrate example embodiments of tool structures.

Figure 7:
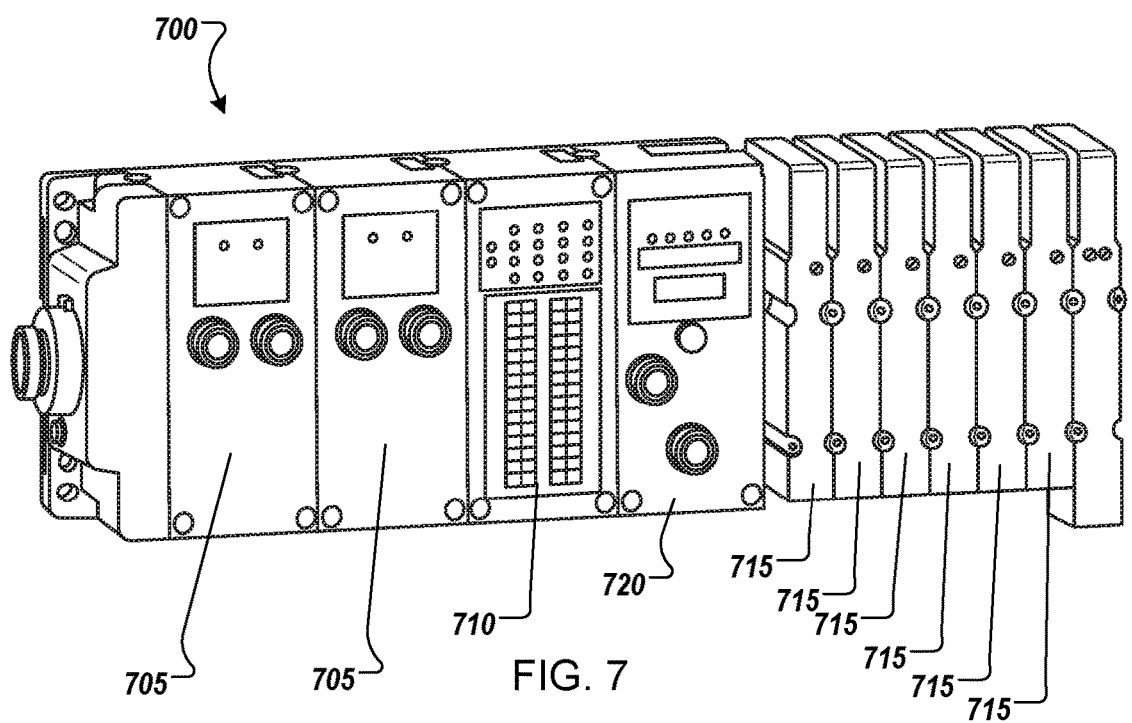
FIG. 7 illustrates the control unit that controls the tool in accordance with example embodiments of the present application.
Figure 8:
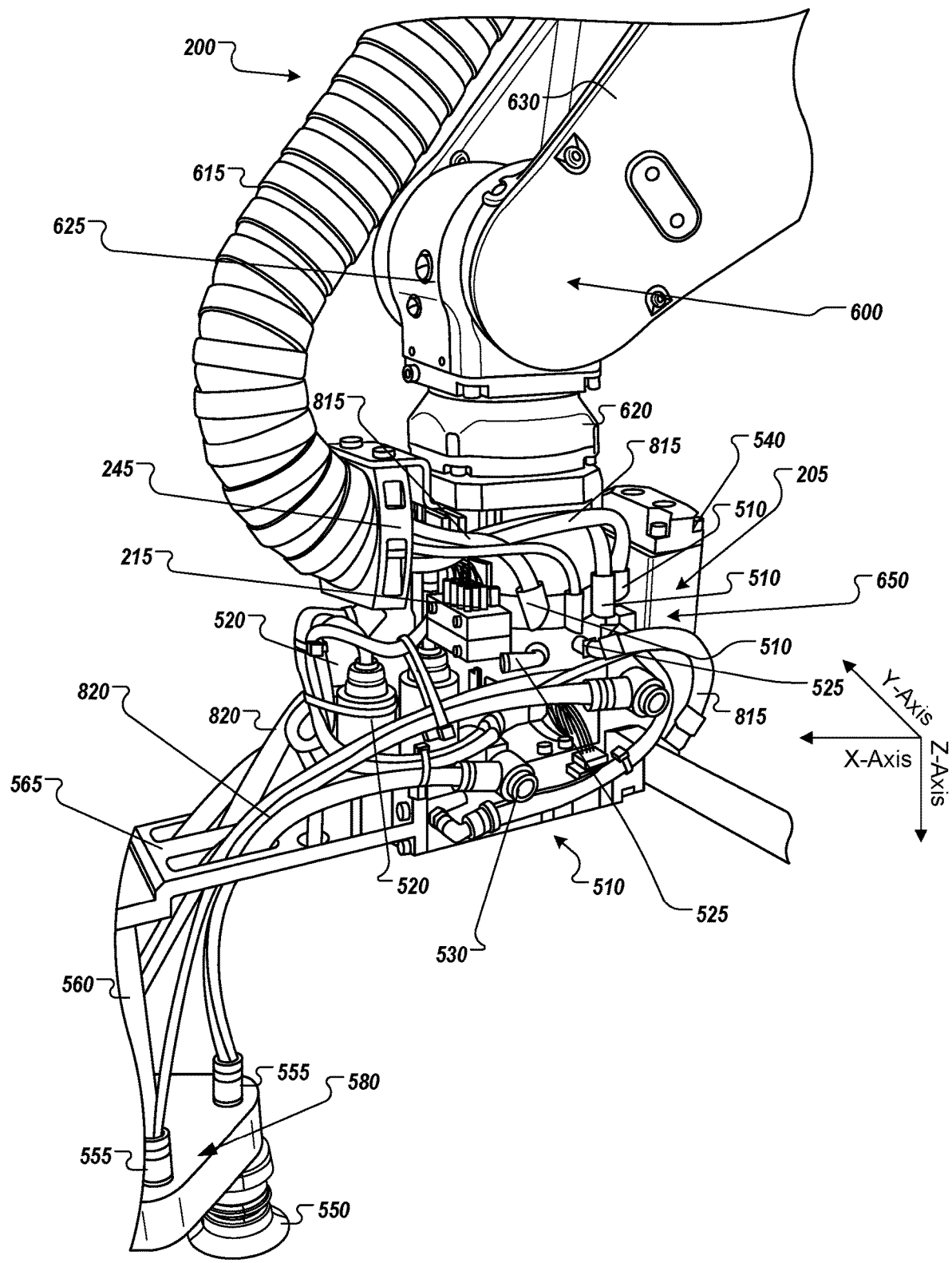
FIGS. 8 and 9 illustrate additional views of the robotic arm 200 in accordance with example embodiments of the present application.

As illustrated in FIG. 2, the tool support structure 205 includes a connector body 215 that connects the tool support structure 205 to the tool structure 210, and also connects the tool support structure 205 to the robotic arm (not shown in FIG. 2; illustrated in FIGS. 7 and 8). Adjacent to the connector body 215 is a receiving port 245 that allows compressed air feeds and wired signal lines or connections to be provided to the connector body 215. The tool support structure 205 also includes an air compressor 240 that is configured to generate compressed air based on wired signal connections provided from a control unit (not shown in FIG. 2) located away from the robotic arm 200. In some example implementations, the air compressor 240 may be positioned adjacent to the connector body and generate compressed air to drive the tool structure 210 while the control unit may be located on another part of the robotic arm 200, at the base of the robotic arm 200 or another location further from the tool structure 210 than the tool support structure 205. In such example implementations, the air compressor 240 may be located closer to the tool structure 210 than the control unit.

Further, as discussed below, the compressor 240 may be mechanically coupled to one or more vacuum ejectors that generate vacuum pressure for the tool structure 210 using the compressed air. For example, the vacuum ejector may allow compressed air to be passed through a nozzle shaped to create a low-pressure zone that provides vacuum pressure to the tool structure. This structure may allow vacuum pressure to be generated on the tool support structure 205 without any moving parts being required.

For example, in some example embodiments, the control unit may be placed at a base of the robotic arm 200 or at the base of the support structure on which the robotic arm 200 may be mounted. The wired signal lines may connect the control unit to the air compressor 240 and other components on the robotic arm 200 through the receiving port 245. Further, it may be understood that in some example embodiments a control unit may be provided on the robotic arm 200, or a combination of multiple control units may work together and be located both on the robotic arm 200 and away from the robotic arm 200.

Figure 11:
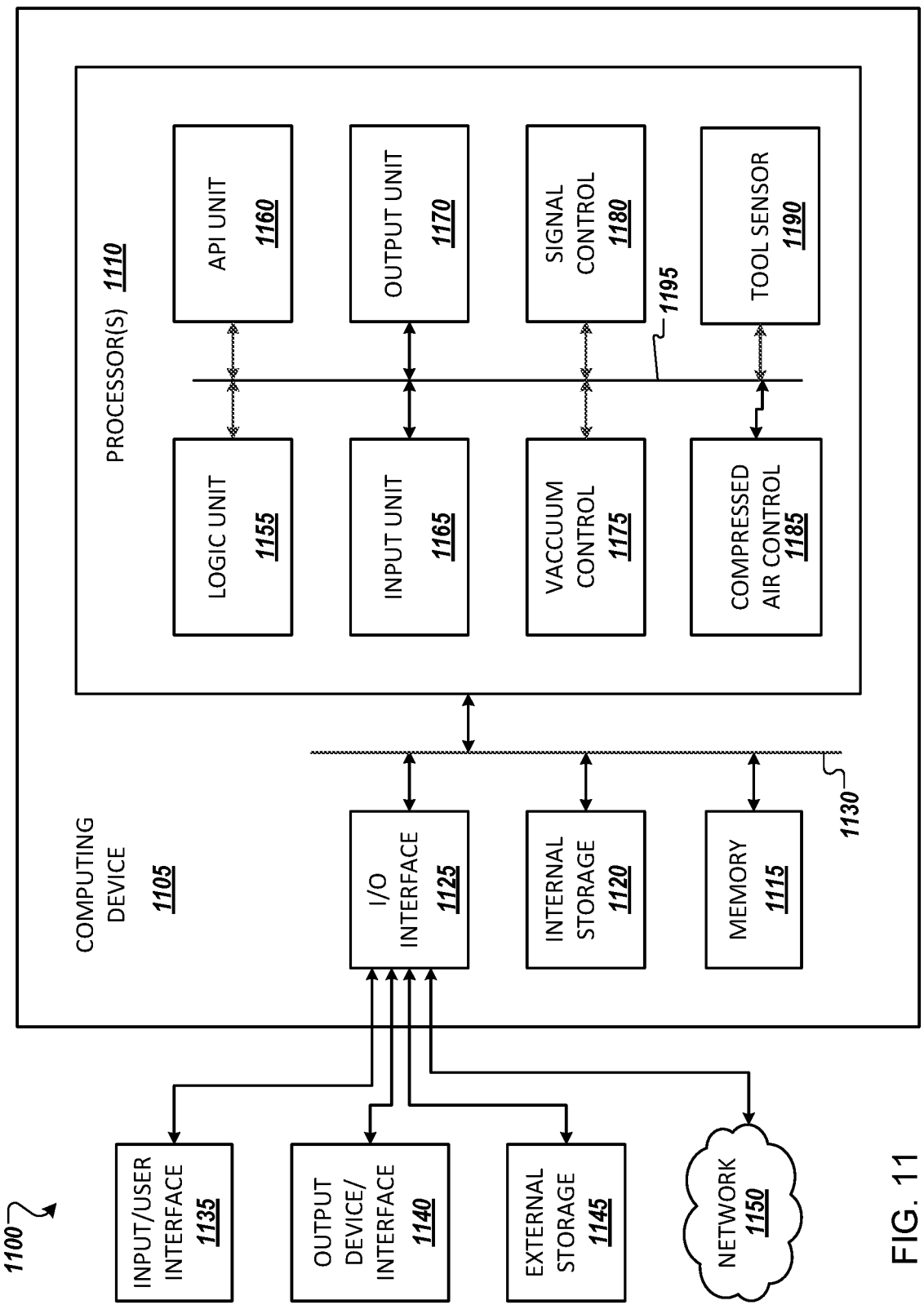
FIG. 11 illustrates an example computing environment with an example computer device suitable for use in some example embodiments of the present application.

The control unit may include a computing device such as a computing device 1105 of the computing environment 1100 as illustrated in FIG. 11 and discussed below.

The tool structure 210 can include one or more structural members 260 and 265 on which the other components may be mounted. The structural members 260 and 265 may be formed as rigid rods or frames on which other components can be mounted and supported. The structural members 260/265 may be formed from metals, such as steel, cast iron, aluminum, or any other metal or alloy that might be apparent to a person of ordinary skill in the art. The structural members 260/265 may also be formed from ceramic materials, composite materials or any other structural material that might be apparent to a person of ordinary skill in the art.

The tool structure 210 also includes a connector receiver 275 that is configured to couple to the connector body 215 to provide structural and electrical connection between the tool structure 210 and the tool support structure 205. The tool structure 210 may also include a tool head 280 connected to connector receiver 275 by the structural members 260 and 265. For example, the structural member 265 may be connected to the connector receiver 275 and the tool head 280 may be connected to the structural member 265 by the structural member 260. The tool head 280 may be shaped and sized to support one or more tool components. Examples of tool components may include suction cups, grippers, claws, fingers or any other tool components that might be apparent to a person of ordinary skill in the art.

As discussed in greater detail below, the connector receiver 275 may have one or more compressed air channels to route the compressed air feeds from the tool support structure 210 to one or more compressed air ports 225 distributed around the tool structure 210. The compressed air ports 225 may be connected by compressed air hoses (not shown) to actuators or other components on the tool structure 210 that are driven by compressed air.

In FIG. 2, the connector receiver 275 of the tool support structure 205 may have sufficient compressed air channels to route compressed air feeds to a number of the compressed air ports 225. For example, a sufficient number of the compressed air channels can be when the tool support structure 205 includes a one-to-one correspondence between compressed air channels and the compressed air ports 225 such that one of the compressed air channels provides compressed air to one of the compressed air port 225. As a specific example, as illustrated in FIG. 2, the number of the compressed air ports 225 may be 6. There could also be a many-to-one correspondence such that multiple instances of the compressed air channels provides compressed air to a single instance of the compressed air port 225 or a single instance of the compressed air channels provides compressed air to multiple compressed air ports 225. Further, one or more valves may be integrated into the connector receiver 275 to dynamically connect air channels with different compressed air ports 225 and control air flow.

In some examples, the compressed air ports 225 may connect to actuators in gripper attachments to open and close gripper claws. The compressed air ports 225 may also connect to actuators that operate fingers of a robotic tool hand. The compressed air ports 225 may also be mechanically coupled to vacuum ejectors to generate a vacuum pressure for the tool structure 210 using streams of compressed air. For example, the compressed air may be passed through a nozzle shaped to create a low-pressure zone that provides vacuum pressure for the tool head 280.

Further, in some example implementations the vacuum pressure from the vacuum ejectors may be provided to vacuum ports 230 that may be connected by pressure hoses (illustration omitted for clarity; shown in FIG. 8) to a suction port 255 of suction cups 250 on the tool head 280 of the robotic arm 200. One or more pressure sensors 220 may be mechanically coupled to the compressed air ports 225 and the vacuum ports 230. The one or more pressure sensors 220 may communicate with the control unit by wired signal lines to provide a feedback signal on system pressure. Alternatively, the one or more pressure sensors 220 may communicate with the control unit wirelessly.

In other words, compressed air is provided to the tool support structure 205 by the air compressor 240, controlled by the control unit, and provided to ejectors. The ejectors may generate vacuum pressure and provide the vacuum pressure to the suction cups 250 located on the end of the tool head 280. By generating the vacuum pressure on the tool structure 210, vacuum pressures measured at the suction cups 250 may be greater than vacuum pressures generated using vacuum generators located at the base of the robotic arm 200 or at other locations more distant from tool head 280 than the tool structure 210. Similarly, placement of the air compressor 240 on the tool support structure 205 may allow greater air pressure may be generated and maintained compared to compress air generated at the base of the robotic arm or other locations more distant from the tool structure than the tool support structure 205.

Figure 3:
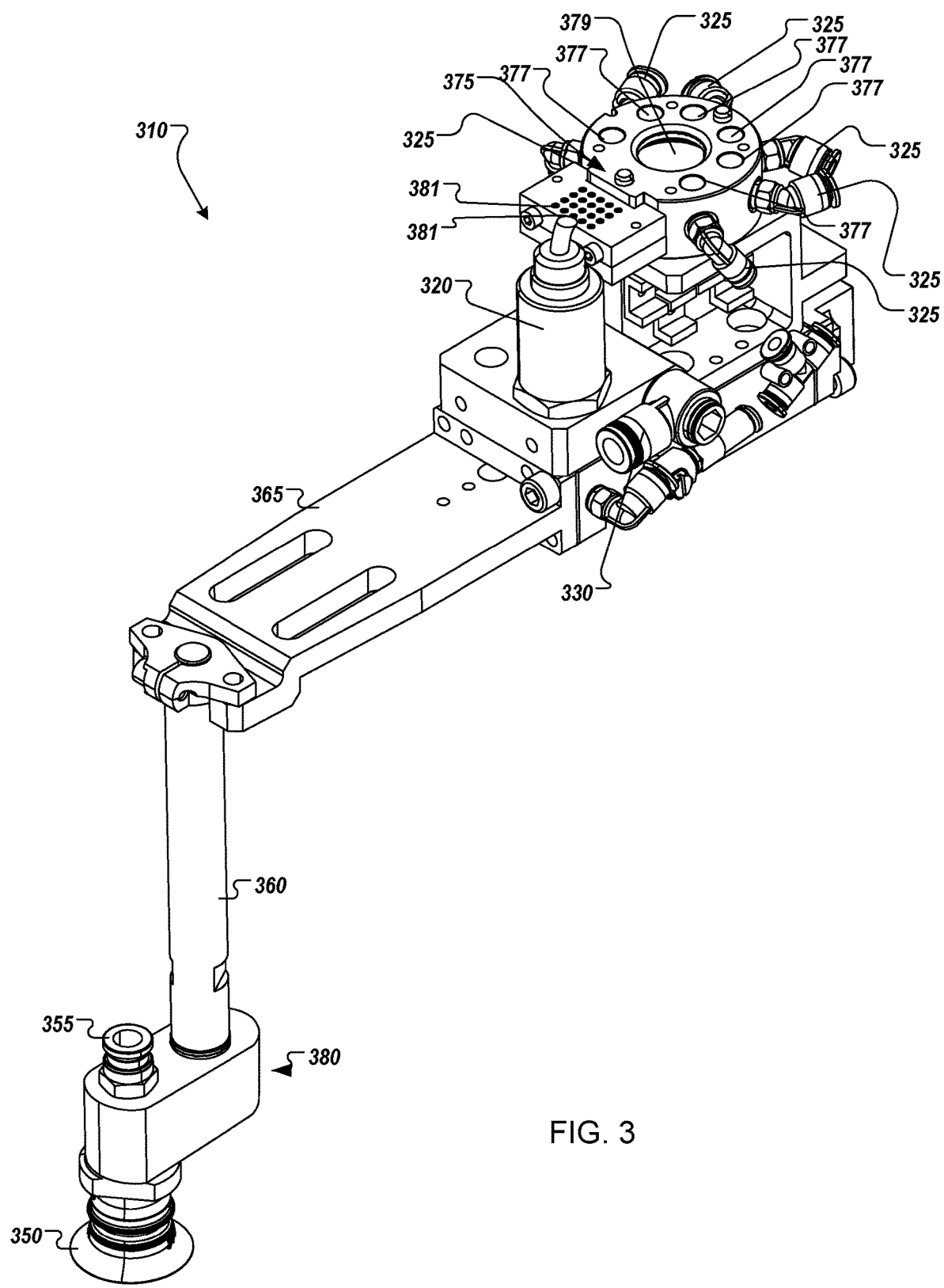
FIG. 3 illustrates a perspective view of a tool structure of a robotic arm in accordance with example embodiments of the present application.

FIG. 3 illustrates a perspective view of a tool structure 310 of a robotic arm in accordance with example embodiments of present application. The tool structure 310 may connect to a tool support structure of a robotic arm such as the tool support structure 205 illustrated in FIG. 2 and discussed above.

Similar to the tool structure 210 of FIG. 2 discussed above, the tool structure 310 includes one or more structural members 360 and 365 on which the other components may be mounted. The structural members 360 and 365 may be formed as rigid rods or frames on which other components can be mounted and supported. The structural members 360/365 may be formed from metals, such as steel, cast iron, aluminum, or any other metal or alloy that might be apparent to a person of ordinary skill in the art. The structural members 360/365 may also be formed from ceramic materials, composite materials or any other structural material that might be apparent to a person of ordinary skill in the art.

The tool structure 310 also includes a connector receiver 375 that is configured to couple to a connector body, such as the connector body 215 of FIG. 2 of the tool support structure 205 of FIG. 2 discussed above, to provide structural and electrical connection between the tool structure 310 and the tool support structure 205. The tool structure 310 may also include a tool head 380 connected to connector receiver 375 by the structural members 360 and 365. For example, the structural member 365 may be connected to the connector receiver 375 and the tool head 380 may be connected to the structural member 365 by the structural member 360. The tool head 380 may be shaped and sized to support one or more tool components. Examples of tool components may include suction cups, grippers, claws, fingers or any other tool components that might be apparent to a person of ordinary skill in the art.

As illustrated, the connector receiver 375 includes a plurality of air channels 377 to route the compressed air feeds from the tool support structure 310 to one or more compressed air ports 325 distributed around the tool structure 310. As illustrated in FIG. 3, the connector receiver 375 can provide 6 of the air channels 377 that feed into 6 of the compressed air ports 325. It is understood that the tool structure 310 can include a different number of the compressed air ports 325 than 6. There can be a one-to-one correspondence between the compressed air channels 377 and the compressed air ports 325 such that one of the air channels 377 feeds compressed air to one of the compressed air ports 325. There could also be a many-to-one correspondence such that multiple air channels 377 feed compressed air to a single compressed air port 325 or a single air channel 377 feeds multiple compressed air ports 325. Further, one or more valves may be integrated into the connector receiver 375 to dynamically connect or change connections between the air channels 377 with different compressed air ports 325 and control air flow.

The compressed air ports 325 may be connected to an air compressor (not shown) on the tool structure (not shown) and also be connected by compressed air hoses (not shown) to actuators or other components on the tool structure 310 that are driven by compressed air. For example, the compressed air ports 325 may connect to actuators in gripper attachments to open and close gripper claws. The compressed air ports 325 may also connect to actuators that operate fingers of a robotic tool hand. The compressed air ports 325 may also be connected to one or more vacuum ejectors to generate a vacuum pressure for the tool structure 310. For example, the compressed air may be passed through a nozzle shaped to create a low-pressure zone that provides vacuum pressure for the tool head 380.

Further, in some example implementations the vacuum ejectors can provide the vacuum pressure to vacuum ports 330 that may be connected by pressure hoses (omitted here for clarity; shown in FIG. 8) to a suction port 355 of one or more suction cups 350 on the tool head 380 of the arm. Further, a pressure sensor 320 may be mechanically coupled to the compressed air port 325 and the vacuum port 330 to provide a feedback signal on system pressure to a control unit. As illustrated in FIG. 3, a single pressure sensor 320, a single compressed air port 325, and a single suction cup 350 is provided.

The vacuum ejectors may generate vacuum pressure for the tool head 380 using compressed air and provide the vacuum pressure to the suction cup 350. By generating the vacuum pressure on the tool structure 310, vacuum pressures measured at the suction cups 350 may be greater than vacuum pressures generated using vacuum generators located at the base of a robotic arm or at other locations more distant from tool head 380 than the tool structure 310.

Additionally, the connector receiver 375 may also include a support bracket section 379 that engages a corresponding bracket (discussed with respect to FIG. 6) to structurally connect the tool structure 310 to the tool support structure. The connector receiver 375 also includes relays 381 or signal lines for sending and receiving signals between the tool structure 310, and a control unit located on or adjacent to the tool support structure.

In some example embodiments, the control unit may be located at the base of a tool support structure supporting the tool structure 310. The control unit may be directly connected by signal lines to electrical components located on the tool structure 310, such as air compressors, control valves for controlling vacuum pressure and compressed air flow, the pressure sensors 320 or any other components that may send or receive electrical signals from the control unit. By locating the control unit, sometimes referred to as a remote module, at the base of the tool support structure, and directly connected to the components on the tool structure 310, electronic noise or other signal interference may be reduced or minimized.

As an example, the tool structure 310 may have, but is not limited to, 10 digital inputs and 10 digital outputs to communicate with the control unit. Based on the layout of the digital inputs and digital outputs, the control unit may detect the configuration of the tool structure 310. For example, using the digital input and output (I/O) signals from the tool structure 310, the control unit may determine when the tool structure 310 is attached and which tool structure 310 is attached.

In some example embodiments, different tool structures may have different tool identifiers that are unique to a specific instance of the tool structures or the type, classification, or configuration of the tool structures. Signal pin configurations for signal and power supply may be dynamically detected to determine the tool identifier of connected tool structures based on signals sent to the tool structure 310 and feedback signals received from the tool structure 310, and the control unit may select a signal configuration of the tool structure 310 to better control a connected tool. For example, detection of a high voltage on a specific signal pin (e.g., pin 1), and low voltage on a different signal pin (e.g., pin 2) may be indicative of the tool identifier for a first type of tool structure, such as a suction or vacuum tool. Conversely, low voltage on signal pin 1 and high voltage on signal pin 2 may be indicative of the tool identifier for a different type of tool structure, such as a gripper configured to mechanically grasp an object. In some example embodiments, the control unit may dynamically terminate or disable power supplied from the tool support structure when the tool structure 310 is disconnected or is not properly attached, to affect safety during tool changing operations.

In some example embodiments, the control unit may also dynamically determine the tool identifier of connected tool structures based on a sensor detecting a computer readable image code (e.g., a barcode, quick response (QR) code, or any other computer readable code that might be apparent to a person of ordinary skill in the art) positioned on the connector or the tool when connected, or a sensor detecting a short range wireless signal (e.g., near-field communication (NFC), Radio-frequency identification (RFID), or other short range wireless communication that might be apparent to a person of ordinary skill in the art) broadcast from the connector or the tool.

Figure 4:
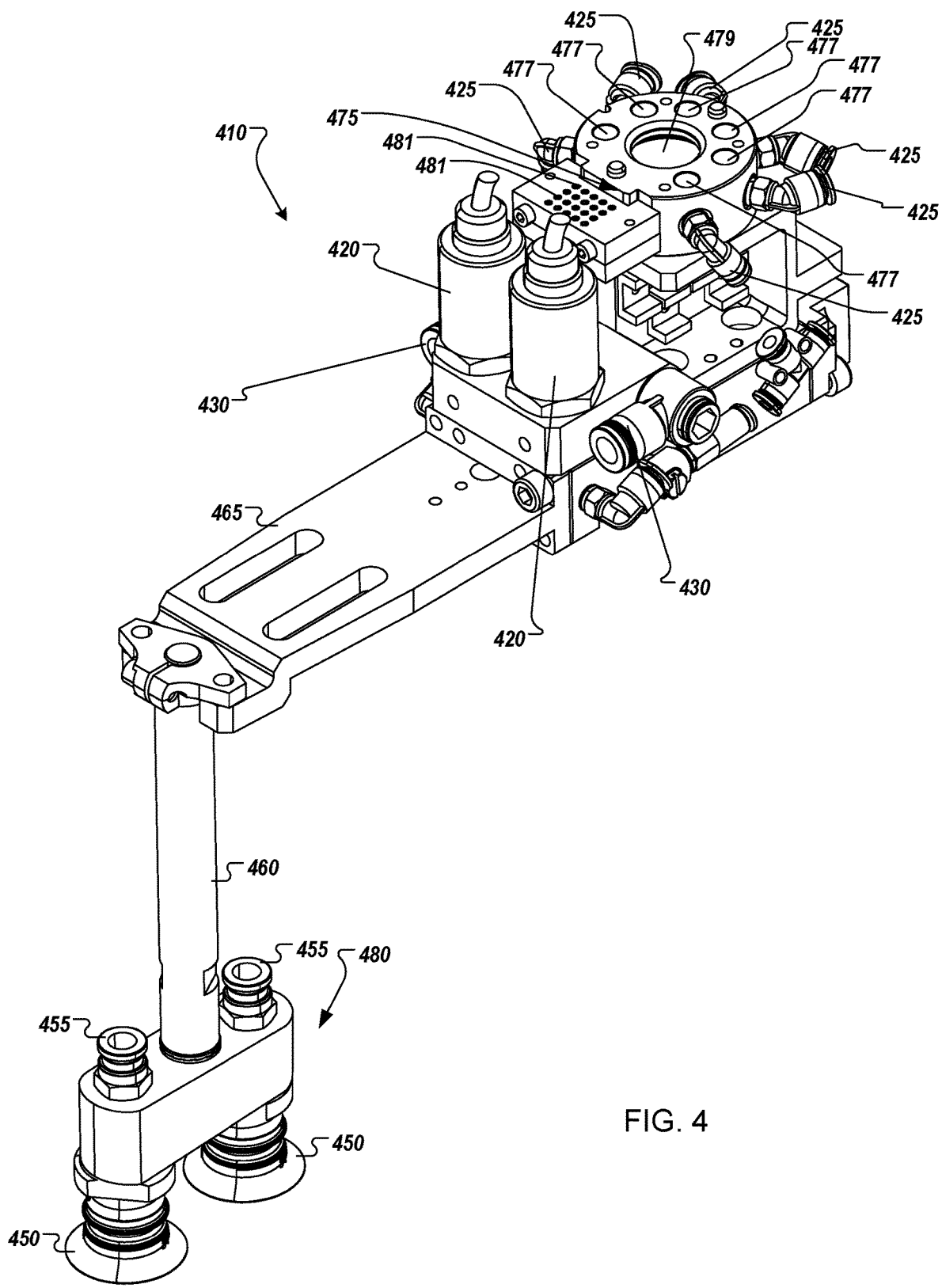
FIG. 4 illustrates a perspective view of another tool structure of a robotic arm in accordance with example embodiments of the present application.

FIG. 4 illustrates a perspective view of another tool structure 410 of a robotic arm in accordance with example embodiments of the present application. The tool structure 410 may connect to a tool support structure of a robotic arm such as the tool support structure 205 illustrated in FIG. 2 and discussed above. The tool structure 410 may have features similar to those discussed above with respect to the tool structure 310 of FIG. 3 and similar reference numerals may be used herein.

The tool structure 410 can include one or more structural members 460 and 465 on which the other components may be mounted. The structural members 460 and 465 may be formed as rigid rods or frames on which other components can be mounted and supported. The structural members 460/465 may be formed from metals, such as steel, cast iron, aluminum, or any other metal or alloy that might be apparent to a person of ordinary skill in the art. The structural members 460/465 may also be formed from ceramic materials, composite materials or any other structural material that might be apparent to a person of ordinary skill in the art.

The tool structure 410 also includes a connector receiver 475 that is configured to couple to a connector body, such as the connector body 215 of FIG. 2 of the tool support structure 205 of FIG. 2 discussed above, to provide structural and electrical connection between the tool structure 410 and the tool support structure 205. The tool structure 410 may also include a tool head 480 connected to connector receiver 475 by the structural members 460 and 465. For example, the structural member 465 may be connected to the connector receiver 475 and the tool head 480 may be connected to the structural member 465 by the structural member 460. The tool head 480 may be shaped and sized to support one or more tool components. Examples of tool components may include suction cups, grippers, claws, fingers or any other tool components that might be apparent to a person of ordinary skill in the art.

As illustrated, the connector receiver 475 includes a plurality of air channels 477 to route the compressed air feeds from the tool structure 410 to one or more compressed air ports 425 distributed around the tool structure 410. As illustrated in FIG. 4, the connector receiver 475 can provide 6 of the air channels 477 that feed into 6 of the compressed air ports 425, although it is understood that the tool structure 410 can include a different number of the compressed air ports 425. There can be a one-to-one correspondence between the compressed air channels 477 and the compressed air ports 425 such that a single air channel 477 feeds compressed air to a single compressed air port 425. There could also be a many-to-one correspondence such that multiple air channels 477 feed compressed air to a single compressed air port 425 or a single air channel 477 feeds multiple compressed air ports 425. Further, one or more valves may be integrated into the connector receiver 475 to dynamically connect or change connections between the air channels with different compressed air ports 425 and control air flow.

The compressed air ports 425 may be connected to an air compressor (not shown) on the tool structure (not shown) and also be connected by compressed air hoses (not shown) to actuators or other components on the tool structure 410 that are driven by compressed air. For example, the compressed air ports 425 may connect to actuators in gripper attachments to open and close gripper claws. The compressed air ports 425 may also connect to actuators that operate fingers of a robotic tool hand. The compressed air ports 425 may also be connected to one or more vacuum ejectors to generate a vacuum pressure for the tool structure 410. For example, the compressed air may be passed through a nozzle shaped to create a low-pressure zone that provides vacuum pressure for the tool head 480.

Further, in some example implementations, the vacuum ejectors may provide vacuum pressure to vacuum ports 430 that may be connected by pressure hoses (omitted here for clarity; shown in FIG. 8) to suction ports 455 of suction cups 450 on the tool head 480 of the arm. Further, a plurality of pressure sensors 420 may be mechanically coupled to the compressed air ports 425 and the vacuum ports 430 and also communicatively coupled to the control unit to provide a feedback signal on system pressure to a control unit. As illustrated in FIG. 4, a pair of (two) pressure sensors 420, a pair of compressed air ports 425, and a pair of suction cups 450 are provided.

The vacuum ejectors may generate vacuum pressure for the tool head 480 using compressed air and provide the vacuum pressure to the suction cups 450 located on the end of the tool head 480. By generating the vacuum pressure on the tool structure 410, vacuum pressures measured at the suction cups 450 may be greater than vacuum pressures generated using vacuum generators located at the base of a robotic arm or at other locations more distant from tool head 480 than the tool structure 410.

Additionally, the connector receiver 475 may also include a support bracket section 479 that engages a corresponding bracket (discussed with respect to FIG. 6) to structurally connect the tool structure 410 to the tool support structure. Further, the connector receiver 475 also includes relays 481 or signal lines for sending and receiving signals between the tool structure 410 and a control unit located on or adjacent to the tool support structure.

In some example embodiments, the control unit may be located at the base of a tool support structure supporting the tool structure 410. The control unit may be directly connected by signal lines to electrical components located on the tool structure 410, such as air compressors, control valves for controlling vacuum pressure and compressed air flow, the pressure sensors 420 or any other components that may send or receive electrical signals from the control unit. By locating the control unit, sometimes referred to as a remote module, at the base of the tool support structure, and directly connected to the components on the tool structure 410, electronic noise or other signal interference may be reduced or minimized.

As an example, the tool structure 410 may have 10 digital inputs and 10 digital outputs to communicate with the control unit. Based on the layout of the digital inputs and digital outputs, a control unit may detect the configuration of the tool structure 410. For example, using the digital input and output (I/O) signals from the tool structure 410, the control unit may determine when the tool structure 410 is attached and which tool structure 410 is attached.

In some example embodiments, different tool structures may have different tool identifiers that are unique to a specific instance of the tool structures or the type, classification, or configuration of the tool structures. Signal pin configurations for signal and power supply may be dynamically detected to determine the tool identifier of connected tool structures based on signals sent to the tool structure 410 and feedback signals received from the tool structure 410, and the control unit may select a signal configuration of the tool structure 410 to better control a connected tool. For example, detection of a high voltage on a specific signal pin (e.g., pin 1), and low voltage on a different signal pin (e.g., pin 2) may be indicative of the tool identifier for a first type of tool structure, such as a suction or vacuum tool. Conversely, low voltage on pin 1 and high voltage on pin 2 may be indicative of the tool identifier for a different type of tool structure, such as a gripper configured to mechanically grasp an object. Further, in some example embodiments, the control unit may dynamically terminate or disable power supplied from the tool support structure when the tool structure 510 is disconnected or is not properly attached, to affect safety during tool changing operations.

In some example embodiments, the control unit may also dynamically determine the tool identifier of connected tool structures based on a sensor detecting a computer readable image code (e.g., a barcode, quick response (QR) code, or any other computer readable code that might be apparent to a person of ordinary skill in the art) positioned on the connector or the tool when connected, or a sensor detecting a short range wireless signal (e.g., near-field communication (NFC), Radio-frequency identification (RFID), or any other short range wireless communication that might be apparent to a person of ordinary skill in the art) broadcast from the connector or the tool.

Figure 5:
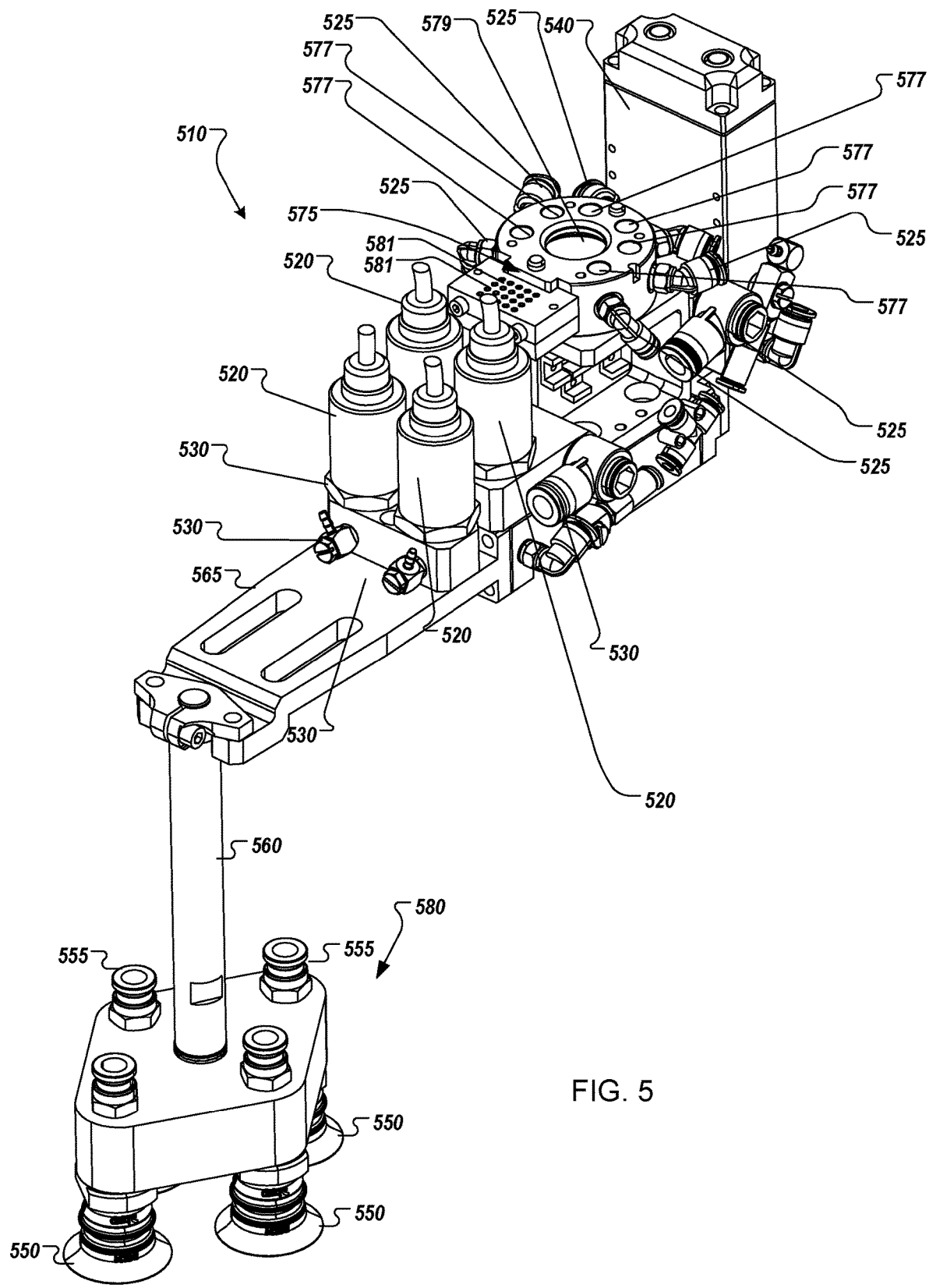
FIG. 5 illustrates a perspective view of another tool structure of a robotic arm in accordance with example embodiments of the present application.

FIG. 5 illustrates a perspective view of another tool structure 510 of a robotic arm in accordance with example embodiments of present application. The tool structure 510 may connect to a tool support structure of a robotic arm such as tool support structure 205 illustrated in FIG. 2 and discussed above. The tool structure 510 may have features similar to those discussed above with respect to the tool structure 310 of FIG. 3 and tool structure 410 of FIG. 4 and similar reference numerals may be used herein.

The tool structure 510 can include one or more structural members 560 and 565 on which the other components may be mounted. The structural members 560 and 565 may be formed as rigid rods or frames on which other components can be mounted and supported. The structural members 560/565 may be formed from metals, such as steel, cast iron, aluminum, or any other metal or alloy that might be apparent to a person of ordinary skill in the art. The structural members 560/565 may also be formed from ceramic materials, composite materials or any other structural material that might be apparent to a person of ordinary skill in the art.

The tool structure 510 also includes a connector receiver 575 that is configured to couple to a connector body, such as the connector body 215 of FIG. 2 of the tool support structure 205 of FIG. 2 discussed above, to provide structural and electrical connection between the tool structure 510 and the tool support structure 205. The tool structure 510 may also include a tool head 580 connected to connector receiver 575 by the structural members 560 and 565. For example, the structural member 565 may be connected to the connector receiver 575 and the tool head 580 may be connected to the structural member 565 by the structural member 560. The tool head 580 may be shaped and sized to support one or more tool components. Examples of tool components may include suction cups, grippers, claws, fingers or any other tool components that might be apparent to a person of ordinary skill in the art.

As illustrated, the connector receiver 575 includes a plurality of air channels 577 to route the compressed air feeds from the tool support structure 510 to one or more compressed air ports 525 distributed around the tool structure 510. As illustrated in FIG. 5, the connector receiver 575 can provide 6 of the air channels 577 that feed into 6 of the compressed air ports 525, although it is understood that the tool structure can have a different number of the compressed air ports 525. There can be a one-to-one correspondence between the compressed air channels 577 and the compressed air ports 525 such that a single air channel 577 feeds compressed air to a single compressed air port 525. There could also be a multi-to-one correspondence such that multiple air channels 577 feed compressed air to a single compressed air port 525 or a single air channel 577 feeds multiple compressed air ports 525. Further, one or more valves may be integrated into the connector receiver 575 to dynamically connect or change connections between the air channels 477 with different compressed air ports 525 and control air flow.

The compressed air ports 525 may be connected to an air compressor 540 on the tool structure 510 and may also be connected by compressed air hoses to actuators or other components on the tool structure 510 that are driven by compressed air. For example, the compressed air ports 525 may connect to actuators in gripper attachments to open and close gripper claws. The compressed air ports 525 may also connect to actuators that operate fingers of a robotic tool hand. The compressed air ports 525 may also be connected to one or more vacuum ejectors to generate vacuum pressures for the tool structure 510. For example, the compressed air may be passed through a nozzle shaped to create a low-pressure zone that provides vacuum pressure for the tool head 580.

Further, in some example implementations, the vacuum ejectors may provide vacuum pressure to vacuum ports 530 that may be connected by pressure hoses (omitted here for clarity; shown in FIG. 8) to suction ports 555 of suction cups 550 on the tool head 580 of the arm. Further, a plurality of pressure sensors 520 may be mechanically coupled to the compressed air ports 525 and the vacuum ports 530 and communicatively coupled to the control unit to provide a feedback signal on system pressure to a control unit. As illustrated in FIG. 5, four pressure sensors 520, four compressed air ports 525, and four suction cups 550 are provided.

The vacuum ejectors may generate vacuum pressure for the tool head 580 using compressed air and provide the vacuum pressure to the suction cups 550 located on the end of the tool head 580. By generating the vacuum pressure on the tool structure 510, vacuum pressures measured at the suction cups 550 may be greater than vacuum pressures generated using vacuum generators located at the base of a robotic arm or at other locations more distant from tool head 580 than the tool structure 510.

Additionally, the connector receiver 575 may also include a support bracket section 579 that engages a corresponding bracket (discussed with respect to FIG. 6) to structurally connect the tool structure 510 to the tool support structure. Further, the connector receiver 575 also includes relays 581 or signal lines for sending and receiving signals between the tool structure 510 and a control unit located on or adjacent to the tool support structure.

In some example embodiments, the control unit may be located at the base of a tool support structure supporting the tool structure 510. The control unit may be directly connected by signal lines to electrical components located on the tool structure 510, such as air compressors, control valves for controlling vacuum pressure and compressed air flow, the pressure sensors 520 or any other components that may send or receive electrical signals from the control unit. By locating the control unit, sometimes referred to as a "remote module", at the base of the tool support structure, and directly connected to the components on the tool structure 510, electronic noise or other signal interference may be reduced or minimized.

As an example, the tool structure 510 may have 10 digital inputs and 10 digital outputs to communicate with the control unit. Based on the layout of the digital inputs and digital outputs, a control unit may detect the configuration of the tool structure 510. For example, using the digital input and output (I/O) signals from the tool structure 510, the control unit may determine when the tool structure 510 is attached, and which tool structure 510 is attached.

In some example embodiments, different tool structures may have different tool identifiers that are unique to a specific instance of the tool structures or the type, classification, or configuration of the tool structures. Signal pin configurations for signal and power supply may be dynamically detected based on signals sent to the tool structure 510 and feedback signals received from the tool structure 510 to determine the tool identifier of connected tool structures. The control unit may select a signal configuration of the tool structure 510 to better control a connected tool.

For example, detection of a high voltage on a specific signal pin (e.g., pin 1), and low voltage on a different signal pin (e.g., pin 2) may be indicative of the tool identifier for a first type of tool structure, such as a suction or vacuum tool. Conversely, low voltage on pin 1 and high voltage on pin 2 may be indicative of the tool identifier for a different type of tool structure, such as a gripper configured to mechanically grasp an object. Further, in some example embodiments, the control unit may dynamically terminate or disable power supplied from the tool support structure when the tool structure 510 is disconnected or is not properly attached, to improve safety during tool changing operations.

In some example embodiments, the control unit may also dynamically determine the tool identifier of connected tool structures based on a sensor detecting a computer readable image code (e.g., a barcode, quick response (QR) code, or any other computer readable code that might be apparent to a person of ordinary skill in the art) positioned on the connector or the tool when connected, or a sensor detecting a short range wireless signal (e.g., near-field communication (NFC), Radio-frequency identification (RFID), or any other short range wireless communication that might be apparent to a person of ordinary skill in the art) broadcast from the connector or the tool.

Figure 6:
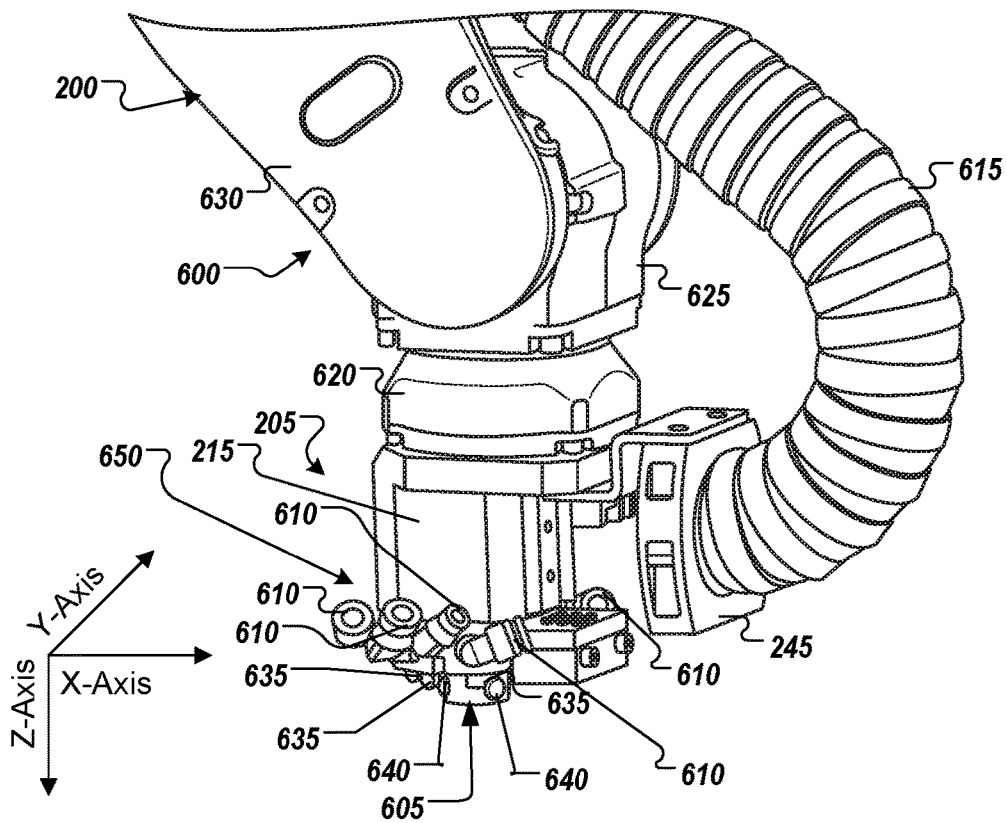
FIG. 6 illustrates the tool support structure attached to the articulation structure of the arm in accordance with example embodiments of the present application.

FIG. 6 illustrates the tool support structure 205 attached to the articulation structure 600 of the robotic arm 200. As illustrated, the tool support structure 205 is supported at an end of the robotic arm 200 by a series of rotational actuators 620 and 625. The first rotational actuator 620 rotates the tool support structure 205 in the plane of the X-axis and Y-axis relative to the second rotation actuator 625. The second rotation actuator 625 rotates the first rotational actuator 620 and the tool support structure 205 in the plane of the X-axis and the Z-axis relative to support frame 630 of the robotic arm 200.

A supply conduit 615 extends along the support frame 630 and around the first and second rotational actuators 620 and 625 and connects to the receiving port 245. The supply conduit 615 provides a pathway for compressed air feed tubes and electrical signal lines to connect into the tool support structure 205. In FIG. 6, the compressed air feed tubes and electrical signal lines are removed for clarity, but are illustrated in FIGS. 7 and 8 discussed below.

The tool support structure 205 also includes a plurality of compressed air ports 610 that receive the compressed air feed tubes and feed the compressed air into the connector structure 605 that engages a connector receiver on a tool structure (e.g., connector receiver 275 of the tool structure 210 of FIG. 2, connector receiver 375 of the tool structure 310 of FIG. 3; connector receiver 475 of the tool structure 410 of FIG. 4; connector receiver 575 of the tool structure 510 of FIG. 5). The connector structure 605 includes a plurality of compressed air channels 635 that are connected to the compressed air ports 610 of the tool support structure 205. The plurality of compressed air channels 635 are positioned to engage corresponding air channels located in the connector receiver of a tool structure (e.g., air channels 377 of the tool structure 310 of FIG. 3; air channels 477 of the tool structure 410 of FIG. 4; air channels 577 of the tool structure 510 of FIG. 5).

The connector structure 605 also includes one or more retaining protrusions 640 that engage a support bracket of a tool structure (e.g., a support bracket section 379 of the tool structure 310 of FIG. 3; a support bracket section 479 of the tool structure 410 of FIG. 4; a support bracket section 579 of the tool structure 510 of FIG. 5) to structurally connect the tool support structure 205 to a tool structure (e.g., tool structure 210; tool structure 310; tool structure 410; tool structure 510).

The connector structure 605 also includes a control unit interface region 650 that provides a location at which the tool structure is communicatively coupled to the control unit. As discussed below, the control unit controls the compressed air flow to the control unit interface region 650 of the tool support structure and the digital I/O to the tool structure 210 is routed through the control unit interface region 650. The control unit may also send instructions to the tool support structure 205 to manipulate the tool structure. The tool support structure 205 can provide mechanical and electrical connection between 1) the tool structures and the robot arm 200 and 2) the tool structures and the control unit.

FIG. 7 illustrates a control unit 700 that controls the tool in accordance with example embodiments of the present application. The control unit 700 includes a plurality of modules 705/710/715/720. Some of the modules may be valve modules 715 that control compressed air flow. For example, valve modules 715 may include magnetic valves that control and regulate the air flow between the tool support structure 210 and the tool structure. In some example embodiments, the valve modules 715 may also adjust the flow rate or pressure of air flowing through the control unit. For example, the valve modules 715 may reduce the pressure from a supply pressure of 600 KPa to an actuator pressure of 200 Kpa.

The control unit 700 may also include a digital Input/Output (I/O) unit 710 that control signal I/O for control signals for manipulation and movement of the tool, as well as collection of sensor information. For example, in some example embodiments, an I/O unit 710 may provide multiple I/O relays as illustrated to control the manipulation and movement of a tool structure (such as tool structure 210, tool structure 310, tool structure 410 and tool structure 510 as well as collect sensor information from position sensors or other digital sensors.

The control unit 700 may also include one or more analog sensor modules 705 that send and receive analog signals. In order to reduce the effects of electronic noise on sensor signal data, current-type analog drive sensors may be connected to and controlled by the analog sensor modules 705 instead of voltage type drive sensors. For example, current-type analog drive sensors may suffer from less electronic noise due to the voltage generated by electronic noise not have sufficient power to generate a large current from the small resistance offer by the current-type analog drive sensors. In some embodiments, as an example, the analog sensor modules 705 may provide 4 or more channels of current-type analog signal detection, which can provide analog signals with reduced noise or undisturbed analog signals for measurement of vacuum pressure, liquid or fluid flow, distance, or other measurements of tool performance. The current-type analog signals can improve reliability in the tool control allowing greater variety of grippers or more powerful grippers.

The control unit 700 may also include a logic module 720 that controls the other modules 705/715 based on command signals received from a user and/or programmed instructions. The logic module 720 may be a computing device such as computing device 1105 of the computing environment 1100 of FIG. 11. The logic module 720 may also detect the changes in the tool structure connected to the tool support structure 205 and alter the operation of the modules 705 and 715. For example, the logic module 720 may detect a high voltage on a specific signal pin (e.g., pin 1), and low voltage on a different signal pin (e.g., pin 2) as being indicative of the tool identifier for a first type of tool structure, such as a suction or vacuum tool and the modules 705 and 715 may be controlled to operate the suction supplied to the vacuum tool to pick up or release items being manipulated by the vacuum tool. Conversely, the logic module 720 may detect low voltage on pin 1 and high voltage on pin 2 as being indicative of the tool identifier for a different type of tool structure, such as a gripper configured to mechanically grasp an object and the modules 705 and 715 may be controlled to open or close the mechanical grippers. Further, in some example embodiments, the logic unit may dynamically terminate or disable power supplied from the tool support structure when the logic unit detects that the tool structure is disconnected or is not properly attached, to affect safety during tool changing operations.

Figure 9:
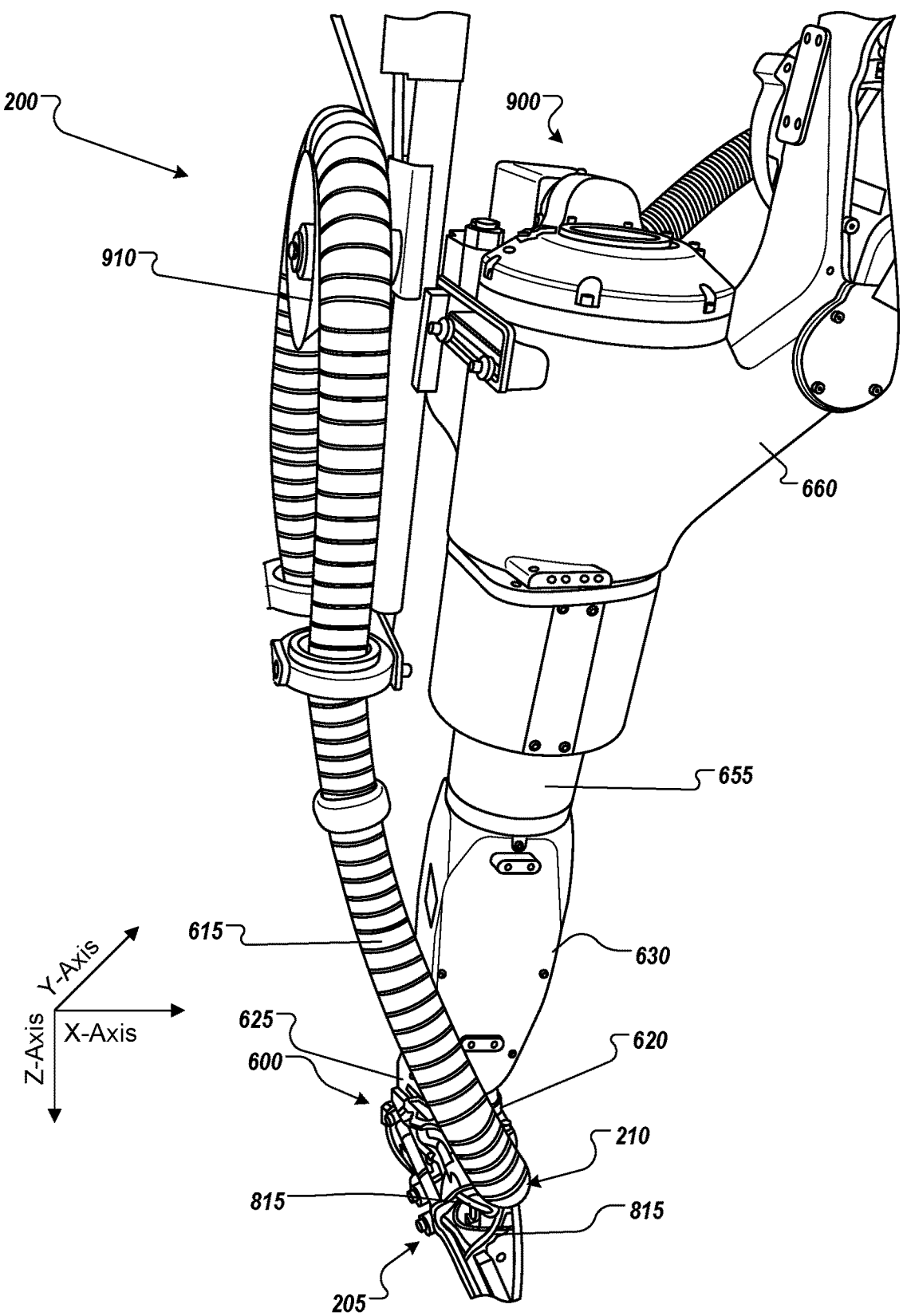

FIGS. 8 and 9 illustrate additional views of the robotic arm 200 in accordance with example embodiments of the present application. FIG. 8 illustrates the tool support structure 205 with a tool structure 510 attached and compressed air hoses provided to supply compressed air. As illustrated, the tool support structure 205 is attached to the articulation structure 600 of the arm 200. The tool support structure 205 can be supported at an end of the arm 200 by a first rotational actuator 620 that rotates the tool support structure 205 in the plane of the X-axis and Y-axis relative to a second rotation actuator 625, and the second rotation actuator 625 that rotates the first rotational actuator 620 and the tool support structure 205 in the plane of the X-axis and the Z-axis relative to the support frame 630 of the arm 200.

The supply conduit 615 can extend along the support frame 630, around the first rotational actuator 620 and the second rotational actuator 625, and can connect to the receiving port 245. The supply conduit 615 provides a pathway for compressed air feed tubes 815 and electrical signal lines to connect into the tool support structure 205. As illustrated, the compressed air feed tubes 815 exist in the supply conduit 615 and connect to a plurality of the compressed air ports 610 on the tool support structure 205 that receive the compressed air feed tubes and feed the compressed air into the connector structure (not numbered in FIG. 8) that engages a connector receiver on a tool structure. In FIG. 8, the tool structure 510 is illustrated as connected to the tool support structure 205.

The connector structure 605 of FIG. 6 includes a plurality of the compressed air channels 635 of FIG. 6 that are connected to the compressed air ports 610 of the tool support structure 205. The plurality of the compressed air channels 635 are positioned to engage corresponding air channels located in the connector receiver of the tool structure 510 (e.g., air channels 577 of the tool structure 510 of FIG. 5).

As described above, the tool structure 510 includes one or more structural members 560 & 565 on which the other components may be mounted. The structural members 560 & 565 may be formed as rigid rods or frames on which other components can be mounted and supported. The structural members 560/565 may be formed from metals, such as steel, cast iron, aluminum, or any other metal or alloy that might be apparent to a person of ordinary skill in the art. The structural members 560/565 may also be formed from ceramic materials, composite materials or any other structural material that might be apparent to a person of ordinary skill in the art.

The tool structure 510 may also include a tool head 580 connected to connector receiver 575 by the structural members 560 and 565. For example, the structural member 565 may be connected to the connector receiver 575 and the tool head 580 may be connected to the structural member 565 by the structural member 560. The tool head 580 may be shaped and sized to support one or more tool components. Examples of tool components may include suction cups, grippers, claws, fingers or any other tool components that might be apparent to a person of ordinary skill in the art.

The tool structure 510 also includes the connector receiver 575 (labeled in FIG. 5) that is configured to couple to the connector body 215 of the tool support structure 205 discussed above, to provide structural and electrical connection between the tool structure 510 and the tool support structure 205.

As described above, the connector receiver 575 includes a plurality of air channels 577 to route the compressed air feeds from the tool support structure 210 to one or more compressed air ports 525 distributed around the tool structure 210. As illustrated in FIG. 5, the connector receiver 575 can provide 6 of the air channels 577 that feed into 6 of the compressed air ports 525. The compressed air ports 525 may be connected by compressed air hoses 820 to actuators or other components on the tool structure 510 that are driven by compressed air from the compressor 540.

Figure 10:
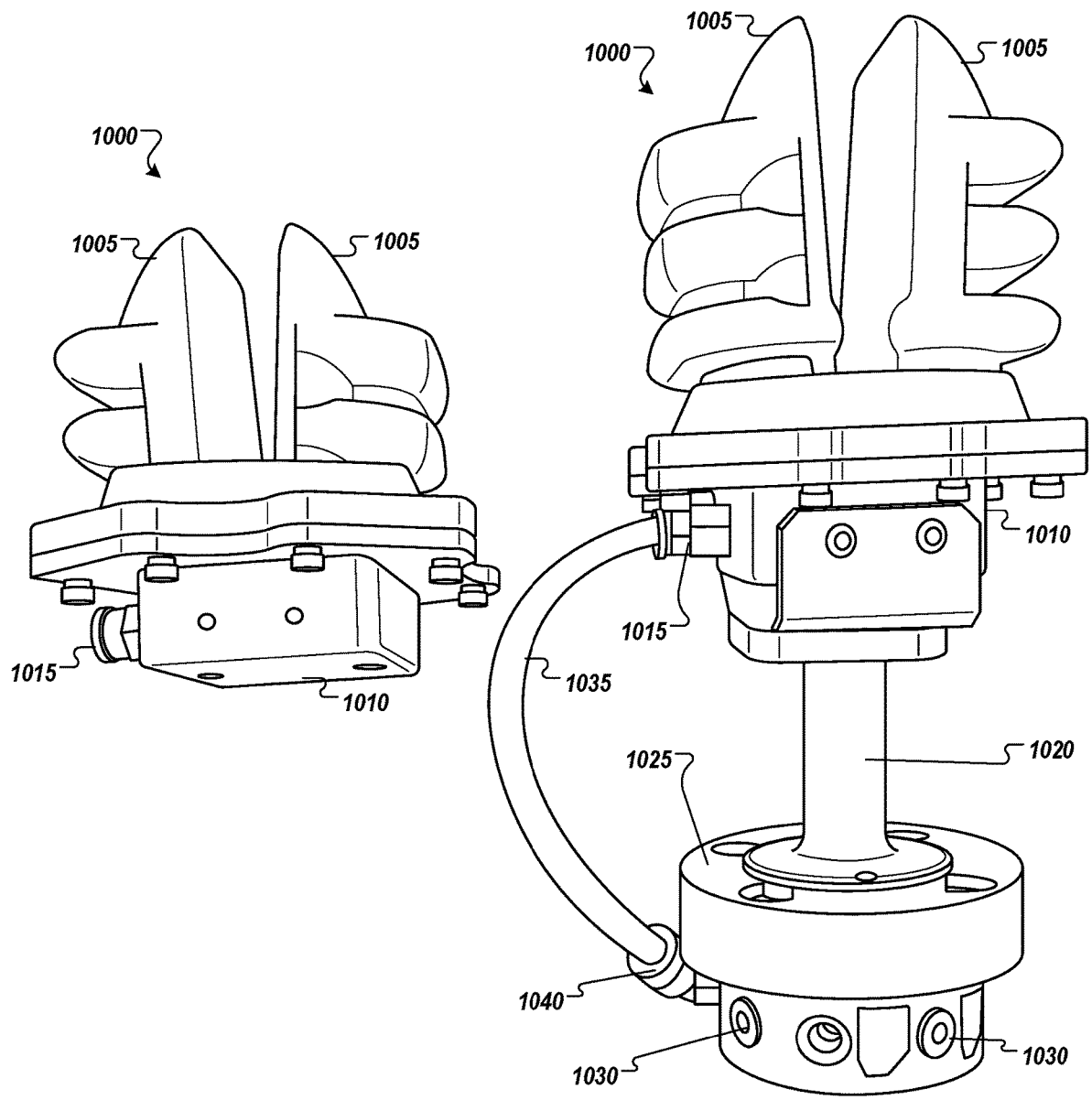
FIG. 10 illustrates a pair of gripper tools to be mounted on a tool support structure of the present application.

For example, the compressed air ports 525 may connect to actuators in gripper attachments to open and close gripper claws (illustrated in FIG. 10). The compressed air ports 525 may also be connected to one or more vacuum ejectors to generate a vacuum pressure for the tool head 580 of the arm. Further, in some example implementations, the vacuum ejectors may provide vacuum pressure to vacuum ports 530 that may be connected by pressure hoses 820 to suction ports 555 of the suction cups 550 on the tool head 580 of the robotic arm 200. Further, a plurality of pressure sensors 520 may be mechanically coupled to the compressed air ports 525 and the vacuum ports 530 and communicatively coupled to the control unit to provide a feedback signal on system pressure to a control unit. As was illustrated in FIG. 5 above, four pressure sensors 520, four compressed air ports 525, and four suction cups 550 may be provided.

The vacuum ejectors may generate vacuum pressure for the tool head 580 using compressed air and provide the vacuum pressure to the suction cups 550 located on the end of the tool head 580. By generating the vacuum pressure on the tool structure 510, vacuum pressures measured at the suction cups 550 may be greater than vacuum pressures generated using vacuum generators located at the base of a robotic arm or at other locations more distant from tool head 580 than the tool structure 510.

Further, the tool structure 510 may have digital inputs and digital outputs that can communicate with the control unit. For example, based on the layout of the 10 digital inputs and 10 digital outputs, a control unit may detect the configuration of the tool structure 510. Using the digital input and output (I/O) signals from the tool structure 510, the control unit may determine when the tool structure 510 is attached and which tool structure is attached. In some example embodiments, different tool structures may have different tool identifiers that are unique to a specific instance of the tool structures or the type, classification, or configuration of the tool structures. Signal pin configurations for signal and power supply may be dynamically detected to determine the tool identifier of connected tool structures, and the control unit may select a signal configuration of the tool structure 510 to better control a connected tool.

For example, detection of a high voltage on a specific signal pin (e.g., pin 1), and low voltage on a different signal pin (e.g., pin 2) may be indicative of the tool identifier for a first type of tool structure, such as a suction or vacuum tool. Conversely, low voltage on pin 1 and high voltage on pin 2 may be indicative of the tool identifier for a different type of tool structure, such as a gripper configured to mechanically grasp an object. Further, in some example embodiments, the control unit may dynamically terminate or disable power supplied from the tool support structure when the tool structure 510 is disconnected or is not properly attached, to improve safety during tool changing operations.

In some example embodiments, the control unit may also dynamically determine the tool identifier of connected tool structures based on a sensor detecting a computer readable image code (e.g., a barcode, quick response (Q) code, or any other computer readable code that might be apparent to a person of ordinary skill in the art) positioned on the connector or the tool when connected, or a sensor detecting a short range wireless signal (e.g., near-field communication (NFC), Radio-frequency identification (RFID), or any other short range wireless communication that might be apparent to a person of ordinary skill in the art) broadcast from the connector or the tool.

FIG. 9 illustrates the support frame 630 connecting a portion of the tool structure 210 and a portion of the tool support structure 205 to an arm support structure 900 of the robotic arm 200. The articulation structure 600 of the robotic arm 200 supports the tool support structure 205 with the first rotational actuator 620 that rotates the tool support structure 205 in the plane of the X-axis and Y-axis relative to the second rotation actuator 625, and a second rotation actuator 625 that rotates the first rotational actuator 620 and the tool support structure 205 in the plane of the X-axis and the Z-axis relative to support frame 630 of the arm 200.

The support frame 630 is connected to a third rotation actuator 655 that rotates the support frame 630 relative to the arm support joint 660. The arm support joint 660 may move the entire arm 200 around a work environment.

The supply conduit 615 can extend along the support frame 630 and around the first and second rotational actuators 620 and 625 and connects to the tool support structure 205. The supply conduit 615 can provide a pathway for compressed air feed tubes and electrical signal lines to connect into the tool support structure 205. As illustrated in FIG. 9, the compressed air feed tubes 815 exit the supply conduit and connect to a plurality of the compressed air ports 610 on the tool support structure 205 that receive the compressed air feed tubes 815 and feed the compressed air into a tool structure. In FIG. 9, a supply conduit contraction mechanism 910 is located on the arm support joint 660 to retract or extend the supply conduit 615 to remove or provide slack for movement of the tool structure 210 relative to support frame 630. The control unit (not shown in FIG. 9) can provide instructions to control the movement of the tool structure 210 and the retraction of the supply conduit contraction mechanism 910.

FIG. 10 illustrates a pair of gripper tools 1000 to be mounted on a tool support structure of the present application. Though suction tool structures are discussed above, example embodiments of the present application are not limited to suction tools. Other tool structures may be used. The gripper tools 1000 may be connected to tool support structures in accordance with example embodiments of the present application (e.g., the gripper tools 1000 may engage the tool support structure 205 of FIG. 2 discussed above). The gripper tools 1000 may include a plurality of gripper fingers 1005 attached to a base support 1010. The base support 1010 may include a pressure fitting 1015 connected to a pressure tube 1035. The pressure tube 1035 may connect to a connector fitting 1040 located on a connector structure 1025.

The connector structure 1025 is connected to the base support 1010 by a structural member 1020. The base support 1010 and the structural member 1020 may be formed as rigid structures or frames on which other components can be mounted and supported. The base support 1010 and the structural member 1020 may be formed from metals, such as steel, cast iron, aluminum, or any other metal or alloy that might be apparent to a person of ordinary skill in the art. The base support 1010 and the structural member 1020 may also be formed from ceramic materials, composite materials or any other structural material that might be apparent to a person of ordinary skill in the art.

The connector structure 1025 of the gripper tool 1000 may be configured to connect to the connector structure 605 of the tool support structure 205 of FIG. 6. The connector structure 1025 of the gripper tool 1000 may also include air channels 1030 that communicate with the compressed air channels 635 of FIG. 6 of the tool support structure 205. This connector structure 1025 may allow compressed air to be provided from the tool support structure 205 to manipulate the gripper fingers 1005, such to as to close the grip fingers 1005 (i.e. the grip fingers 1005 in a clamped or pinching configuration). In other words, the compressed air from the tool support structure 205 may be provided to the gripper tool air channels 1030, which communicate with the pressure tubes 1035 through the connector fittings 1040. The pressure tubes 1035 provide the compressed air to the base support 1010 through the pressure fittings 1015. The base support 1010 may provide the compressed air to manipulate the gripper fingers 1005. As the compressed air is controlled, the gripper fingers 1005 may be articulated.

Example Computing Environment

FIG. 11 illustrates an example computing environment 1100 with an example computer device 1105 suitable for use in some example embodiments. Computing device 1105 in computing environment 1100 can include one or more processing units, cores, or processors 1110, memory 1115 (e.g., RAM, ROM, and/or the like), internal storage 1120 (e.g., magnetic, optical, solid state storage, and/or organic), and/or I/O interface 1125, any of which can be communicatively coupled on a communication mechanism or bus 1130 for communicating information or embedded in the computing device 1105.

Computing device 1105 can be communicatively coupled to input/interface 1135 and output device/interface 1140. Either one or both of input/interface 1135 and output device/interface 1140 can be a wired or wireless interface and can be detachable. Input/interface 1135 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 1140 may include a display, television, monitor, printer, speaker, braille, or the like. In some example embodiments, input/interface 1135 (e.g., user interface) and output device/interface 1140 can be embedded with, or mechanically coupled to, the computing device 1105. In other example embodiments, other computing devices may function as, or provide the functions of, an input/interface 1135 and output device/interface 1140 for a computing device 1105. These elements may include, but are not limited to, well-known AR hardware inputs so as to permit a user to interact with an AR environment.

Examples of computing device 1105 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1105 can be communicatively coupled (e.g., via I/O interface 1125) to external storage 1145 and network 1150 for communicating with any number of networked components, devices, and systems, including one or more computing devices of the same or different configuration. Computing device 1105 or any connected computing device can be functioning as, providing services of, or referred to as a server, client, thin server, general machine, special-purpose machine, or another label.

I/O interface 1125 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and networks in computing environment 1100. Network 1150 can be any network or combination of networks (e.g., the Internet, local area network, wide area network, a telephonic network, a cellular network, satellite network, and the like).

Computing device 1105 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1105 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1110 can execute under any operating system (OS) (not shown), in a native or virtual environment. One or more applications can be deployed that include logic unit 1155, application programming interface (API) unit 1160, input unit 1165, output unit 1170, vacuum control unit 1175, signal control unit 1180, compressed air control unit 1185, tool sensor 1190 and inter-unit communication mechanism 1195 for the different units to communicate with each other, with the OS, and with other applications (not shown).

For example, vacuum control unit 1175, signal control unit 1180, compressed air control unit 1185, and tool sensor 1190 may implement one or more processes to control the operation of the robotic arm shown in FIGS. 1-9. The described units and elements can be varied in design, function, configuration, or implementation and are not limited to the descriptions provided.

In some example embodiments, when information or an execution instruction is received by API unit 1160, it may be communicated to one or more other units (e.g., vacuum control unit 1175, signal control unit 1180, compressed air control unit 1185, and tool sensor 1190). In some example embodiments, by detecting the tool structure currently connected to the robotic arm, the computing device 1105 may access different control protocols specific to the connected tool. For example, if the control system detects a pincher type gripper, the computing device 1105 could access routines or protocols that are specific to a pincher type gripper. The routines or protocols may be different from routings or protocols specific to a suction cup gripper.

In some instances, the logic unit 1155 may be configured to control the information flow among the units and direct the services provided by API unit 1160, input unit 1165, vacuum control unit 1175, signal control unit 1180, compressed air control unit 1185, and tool sensor 1190 in some example embodiments described above. For example, the flow of one or more processes or embodiments may be controlled by logic unit 1155 alone or in conjunction with API unit 1160.

Although a few example embodiments have been shown and described, these example embodiments are provided to convey the subject matter described herein to people who are familiar with this field. It should be understood that the subject matter described herein may be implemented in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents.

We claim:

1. A tool structure for a robotic arm, the tool structure comprising:
   at least one structural member;
   a connector mechanically coupled to the structural member and shaped for engaging a tool support structure located on the robotic arm, the connector including:
      at least one compressed air channel disposed within the connector and positioned for receiving compressed air from the tool support structure;
      at least one signal line disposed within the connector and positioned for receiving one or more electrical signals from the tool support structure;
   a control unit mechanically coupled to the at least one structural member, and communicatively coupled to the connector, the control unit configured to sense and adjust performance of the tool structure based on determining that the connector is connected to the tool support structures;
   a tool head mechanically coupled to the at least one structural member, the tool head being controlled by the control unit through the connector; and
   at least one analog drive sensor communicatively coupled to the control unit, the at least one analog drive sensor being positioned and configured to measure performance of the tool head.

2. The structure of claim 1, wherein the tool structure further comprises a vacuum generator disposed on the at least one structural member, the vacuum generator configured to receive compressed air and generate vacuum pressure in response to compressed air received from the tool support structure.

3. The structure of claim 1, wherein the tool support structure comprises at least one signal pin configured to provide an electrical signal from the control unit to the at least one signal line of the connector and receive a feedback signal from the tool support structure; and
   wherein the control unit is configured to dynamically adjust the electrical signal to the signal pin based on the received feedback signal.

4. The structure of claim 3, wherein the control unit is configured to dynamically terminate transmission of the electrical signal to the signal pin based on the received feedback signal indicating that the connector has become disconnected from the tool support structure.

5. The structure of claim 1, wherein the connector comprises a computer readable image code; and wherein the control unit dynamically adjusts transmission of electrical signals provided by the tool support structure based on detection of the computer readable image code.

6. The structure of claim 1, wherein the connector broadcasts a short range wireless signal; and
wherein the control unit dynamically adjusts electrical signals provided by the tool support structure based on detection of broadcast short range wireless signal.

7. A tool system for a robotic arm, the tool system comprising:
a tool support structure;
a tool structure, coupled to the tool support structure, including:
at least one structural member;
a connector mechanically coupled to the structural member and shaped for engaging a tool support structure located on the robotic arm;
a control unit mechanically coupled to the at least one structural member, and communicatively coupled to the connector, the control unit configured to sense and adjust performance of the tool structure based on determining that the connector is connected to the tool support structure; and
a tool head mechanically coupled to the structural member, the tool head being controlled by the control unit through the connector,
wherein the tool structure includes at least one analog drive sensor communicatively coupled to the control unit, the at least one analog drive sensor being positioned and configured to measure performance of the tool head.

8. The tool system of claim 7, the tool structure further comprises a vacuum generator disposed on the at least one structural member, the vacuum generator configured to receive compressed air and generate vacuum pressure in response to compressed air received from the tool support structure.

9. The tool system of claim 7, wherein the tool support structure comprises at least one signal pin configured to provide an electrical signal from the control unit to a signal line of the connector and receive a feedback signal from the tool support structure; and
wherein the control unit is configured to dynamically adjust the electrical signal to the signal pin based on the received feedback signal.

10. The tool system of claim 9, wherein the control unit is configured to dynamically terminate transmission of the electrical signal to the signal pin based on the received feedback signal indicating that the connector has become disconnected from the tool support structure.

11. The tool system of claim 7, wherein the connector comprises a computer readable image code; and
wherein the control unit dynamically adjusts transmission of electrical signals provided by the tool support structure based on detection of the computer readable image code.

12. The tool system of claim 7, wherein the connector broadcasts a short range wireless signal; and
the control unit dynamically adjusts electrical control signals configured to drive the tool head provided by the tool support structure upon detection of broadcast short range wireless signal.

13. A tool structure for a robotic arm, the tool structure comprising:
at least one structural member;
a connector mechanically coupled to the structural member and shaped for engaging a tool support structure located on the robotic arm, the connector comprising:
at least one compressed air channel disposed within the connector and positioned for receiving compressed air from the tool support structure;
at least one signal line disposed within the connector and positioned for receiving one or more electrical signals from the tool support structure;
a control unit mechanically coupled to the at least one structural member, and communicatively coupled to the connector, the control unit configured to sense and adjust performance of the tool structure;
a tool head mechanically coupled to the at least one structural member, the tool head being controlled by the control unit through the connector, wherein the tool head includes:
a vacuum generator disposed on the at least one structural member, the vacuum generator configured to receive compressed air and generate vacuum pressure in response to compressed air received from the tool support structure; and
at least one analog drive sensor communicatively coupled to the control unit, the at least one analog drive sensor being positioned and configured to measure performance of the tool head.

14. The structure of claim 13, wherein the tool support structure comprises at least one signal pin configured to communicatively couple to the at least one signal line of the connector to provide an electrical signal from the control unit to the connector and receive a feedback signal from the tool support structure; and
wherein the control unit is configured to dynamically adjust the electrical signal to the signal pin based on the received feedback signal.

15. The structure of claim 14, wherein the control unit is configured to dynamically terminate transmission of the electrical signal to the signal pin based on the received feedback signal indicating that the connector has become disconnected from the tool support structure.

16. The structure of claim 13, wherein the connector comprises a computer readable image code; and
wherein the control unit dynamically adjusts transmission of electrical signals provided by the tool support structure based on detection of the computer readable image code.

17. The structure of claim 13, wherein the connector broadcasts a short range wireless signal; and
the control unit dynamically adjusts electrical control signals configured to drive the tool head provided by the tool support structure upon detection of broadcast short range wireless signal.

\* \* \* \* \*